United States Patent
Gupta et al.

(10) Patent No.: US 11,297,641 B2
(45) Date of Patent: Apr. 5, 2022

(54) SCHEDULING OF PERIODIC TRAFFIC DUE TO A MISSED TRANSMISSION OPPORTUNITY IN UNLICENSED SPECTRUM

(71) Applicant: QUALCOMM Incorporated, San Diego, CA (US)

(72) Inventors: Piyush Gupta, Bridgewater, NJ (US); Junyi Li, Chester, NJ (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 16/711,057

(22) Filed: Dec. 11, 2019

(65) Prior Publication Data

US 2020/0196345 A1 Jun. 18, 2020

Related U.S. Application Data

(60) Provisional application No. 62/779,311, filed on Dec. 13, 2018.

(51) Int. Cl.
*H04W 72/12* (2009.01)
*H04W 74/08* (2009.01)
(Continued)

(52) U.S. Cl.
CPC ....... *H04W 72/1289* (2013.01); *H04L 5/0055* (2013.01); *H04W 16/14* (2013.01); *H04W 72/044* (2013.01); *H04W 72/121* (2013.01)

(58) Field of Classification Search
CPC . H04W 16/14; H04W 72/044; H04W 72/121; H04W 72/1289; H04L 5/0055
See application file for complete search history.

(56) References Cited

U.S. PATENT DOCUMENTS

2017/0280475 A1 9/2017 Yerramalli et al.
2017/0332358 A1* 11/2017 Park .................... H04W 72/042
(Continued)

FOREIGN PATENT DOCUMENTS

WO 2017196086 A1 11/2017
WO WO-2018171313 A1 * 9/2018 .......... H04W 72/042

OTHER PUBLICATIONS

Ericsson: "On Channel Access for AUL", 3GPP Draft, 3GPP TSG RAN WG1 Meeting #90bis, R1-1717122, 3rd Generation Partnership Project (3GPP), Mobile Competence Centre; 650, Route Des Lucioles; F-06921 Sophia-Antipolis Cedex ; France vol. RAN WG1, No. Prague, Czech Republic; Oct. 9, 2017-Oct. 13, 2017, Sep. 29, 2017, XP051351529, Retrieved from the Internet: URL:http://www.3gpp.org/ftp/tsg_ran/WG1_RL1/TSGR1_90b/Docs/ [retrieved on Sep. 29, 2017], 6 pages.
(Continued)

*Primary Examiner* — Brian P Cox
(74) *Attorney, Agent, or Firm* — Liem T. Do

(57) ABSTRACT

Wireless communications systems and methods related to scheduling communications in a network are provided. A wireless communication device communicates a semi-persistent schedule (SPS) for communicating with a group of wireless communication devices, the SPS including a plurality of resource allocations spaced apart in time. The first wireless communication device identifies a first resource allocation for at least a subset of the group of wireless communication devices based on a missed resource allocation of the plurality of resource allocations associated with a failed listen-before-talk (LBT). Additionally, the wireless communication device communicates with at least the subset of the group of wireless communication devices, communication signals based on the first resource allocation.

30 Claims, 11 Drawing Sheets

(51) Int. Cl.
    *H04L 5/00*    (2006.01)
    *H04W 16/14*    (2009.01)
    *H04W 72/04*    (2009.01)

(56) References Cited

U.S. PATENT DOCUMENTS

2019/0090245 A1* 3/2019 Ansari ............... H04W 72/082
2019/0166613 A1* 5/2019 Zhang ............... H04W 72/1278

OTHER PUBLICATIONS

International Search Report and Written Opinion—PCT/US2019/065929—ISA/EPO—dated Mar. 12, 2020.
Vivo: "Discussion on the Configurations of Configured Grant", 3GPP Draft, 3GPP TSG-RAN WG2 Meeting #104, R2-1818262, Discussion on The Configurations of Configured Grant, 3rd Generation Partnership Project (3GPP), Mobile Competence Centre, 650, Route Des Lucioles, F-06921, Sophia-Antipolis CE, vol. RAN WG2, No. Spokane, USA; Nov. 12, 2018-Nov. 16, 2018, Nov. 12, 2018 (Nov. 12, 2018), XP051557763, 2 pages, Retrieved from the Internet: URL: http://www.3gpp.org/ftp/Meetings%5F3GPP%5FSYNC/RAN2/Docs/R2%2D1818262%2Ezip [retrieved on Nov. 12, 2018], discussion, p. 1, para. 2-p. 2.

* cited by examiner

SCHEDULING OF PERIODIC TRAFFIC DUE TO A MISSED TRANSMISSION OPPORTUNITY IN UNLICENSED SPECTRUM

CROSS REFERENCE TO RELATED APPLICATIONS

This present application claims priority to and the benefit of U.S. Provisional Application No. 62/779,311, filed Dec. 13, 2018, which is hereby incorporated by reference in its entirety.

TECHNICAL FIELD

This application relates to wireless communication systems, and more particularly to scheduling downlink (DL) and/or uplink (UL) transmissions in a network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR-unlicensed (NR-U) may refer to the deployment of a NR cell in an unlicensed spectrum. For example, a NR cell may be deployed in a standalone NR-U mode over one or more unlicensed frequency bands. NR-U may also support cell deployments using various combinations of unlicensed bands and licensed bands.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device, a semi-persistent schedule (SPS) for communicating with a group of wireless communication devices, the SPS including a plurality of resource allocations spaced apart in time; identifying, by the first wireless communication device, a first resource allocation for at least a subset of the group of wireless communication devices based on a missed resource allocation of the plurality of resource allocations associated with a failed listen-before-talk (LBT); and communicating, by the first wireless communication device with at least the subset of the group of wireless communication devices, communication signals based on the first resource allocation.

In an additional aspect of the disclosure, an apparatus includes a processor configured to identify a first resource allocation for at least a subset of a group of wireless communication devices based on a missed resource allocation associated with a failed LBT. The apparatus also includes a transceiver configured to communicate a SPS for communicating with the group of wireless communication devices. The SPS includes a plurality of resource allocations spaced apart in time. The missed resource allocation is associated with the plurality of resource allocations. The transceiver is also configured to communicate with at least the subset of the group of wireless communication devices, communication signals based on the first resource allocation.

In an additional aspect of the disclosure, a computer-readable medium includes program code recorded thereon, the program code including code for causing a first wireless communication device to communicate a SPS for communicating with a group of wireless communication devices, the SPS including a plurality of resource allocations spaced apart in time; code for causing the first wireless communication device to identify a first resource allocation for at least a subset of the group of wireless communication devices based on a missed resource allocation of the plurality of resource allocations associated with a failed LBT; and code for causing the first wireless communication device to communicate with at least the subset of the group of wireless communication devices, communication signals based on the first resource allocation.

In an additional aspect of the disclosure, an apparatus includes means for communicating a SPS for communicating with a group of wireless communication devices, wherein the SPS includes a plurality of resource allocations spaced apart in time; means for identifying a first resource allocation for at least a subset of the group of wireless communication devices based on a missed resource allocation of the plurality of resource allocations associated with a failed LBT; and means for communicating with at least the subset of the group of wireless communication devices, communication signals based on the first resource allocation.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
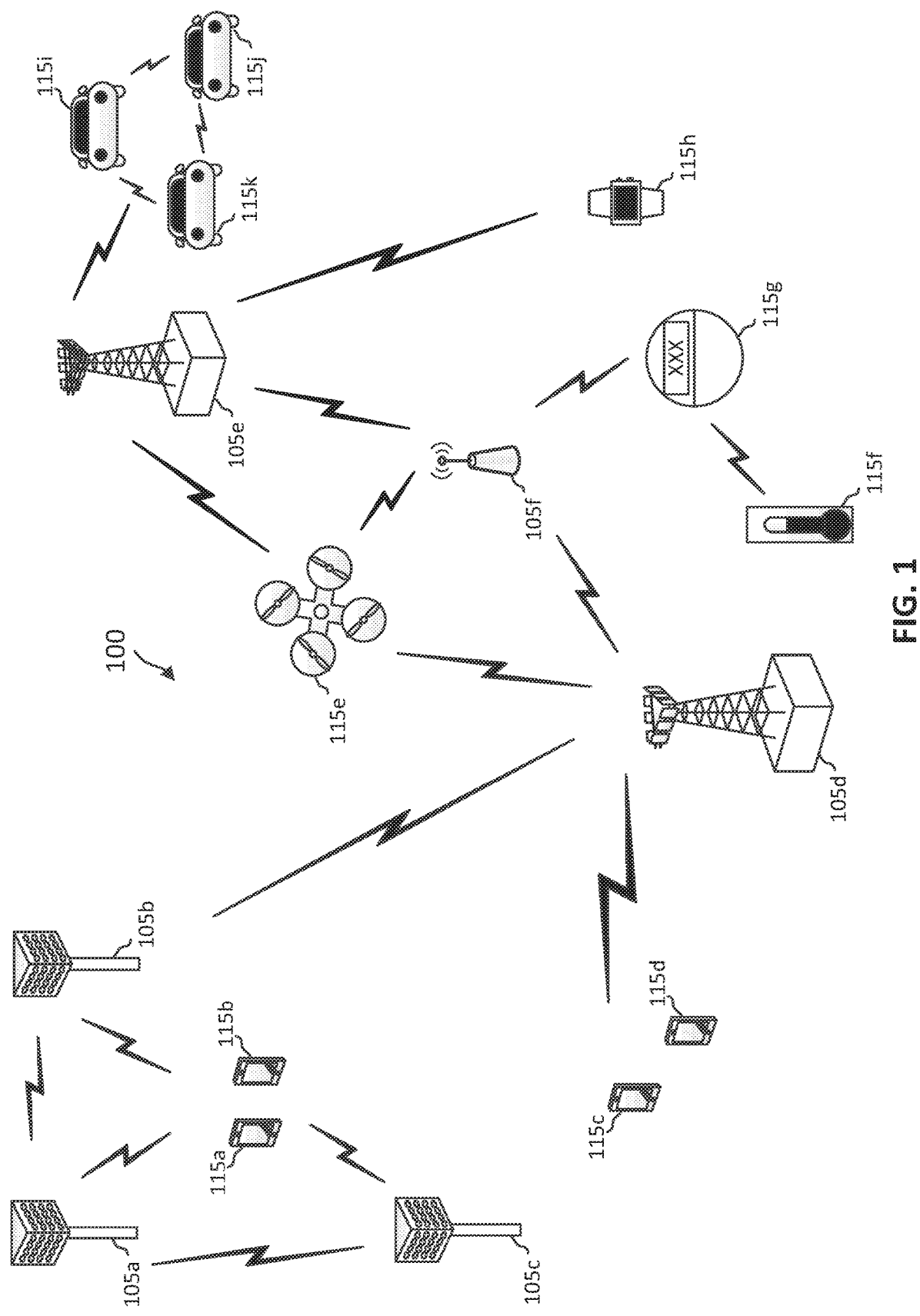
FIG. 1 illustrates a wireless communication network according to one or more embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form to avoid obscuring such concepts.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. The 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The present application describes mechanisms for scheduling downlink (DL) and/or uplink (UL) traffic in an unlicensed or a shared frequency band. If traffic in a network is deterministic and periodic, it may be desirable to keep physical DL control channel (PDCCH) requirements low by scheduling the traffic via semi-persistent scheduling (SPS), which was designed for scenarios where communications consist of regularly repeated transmissions of data chunks of more or less well-known type and size. Particularly, the SPS helps to reduce control channel signaling. With SPS, an ongoing (e.g., repetitive) resource allocation on the DL and/or the UL is set-up. Due to the uncertain nature of unlicensed frequency band, the UE and/or BS may be unable to reserve a TXOP for transmission and/or reception. Accordingly, the UE and/or BS may be unable to transmit in accordance with the SPS time. In such an example, it may be desirable to reschedule one or more resource allocations included in the SPS for a subsequent TXOP.

FIG. 1 illustrates a wireless communications network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive Multiple Input-Multiple Output (MIMO). The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as the small cell BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/frequency-division duplexing (FDD) communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In an embodiment, the network 100 may operate over shared frequency bands or unlicensed frequency bands, for example, at about 3.5 gigahertz (GHz), sub-6 GHz or higher frequencies in the mmWave band. Operations in unlicensed spectrum may include DL transmissions and/or UL transmissions. The network 100 may partition a frequency band into multiple channels or subbands, for example, each occupying about 20 megahertz (MHz).

The BSs 105 and the UEs 115 may be operated by multiple network operating entities sharing resources in the shared or unlicensed frequency spectrum and may perform a listen-before-talk (LBT) procedure (e.g., clear channel assessment (CCA)) prior to communicating to determine whether the channel is available. LBT is a channel access scheme that may be used in the unlicensed spectrum. In an example, a wireless communication device (e.g., the BS 105 or the UE 115) may employ a LBT procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods. In an example, the BS 105 may perform a LBT in the frequency band prior to transmitting in the frequency band and may transmit in one or more channels based on the LBT result. If the channel is available (performance of the LBT results in a LBT pass), the BS 105 may perform a DL transmission, receive a UL transmission from the UE 115, and/or schedule the UE 115 for data transmission and/or reception within a TXOP. If the channel is not available (performance of the LBT results in a LBT fail), the BS 105 may back off and perform the LBT procedure again at a later point in time. In another example, the UE 115 may perform a LBT in the frequency band prior to transmitting in the frequency band and may transmit in one or more channels based on the LBT result. If the channel is available (performance of the LBT results in a LBT pass), the UE 115 may perform a UL transmission or receive a DL transmission from the BS 105. If the channel is not available (performance of the LBT results in a LBT fail), the UE 115 may back off and perform the LBT procedure again at a later point in time.

The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

Figure 2:
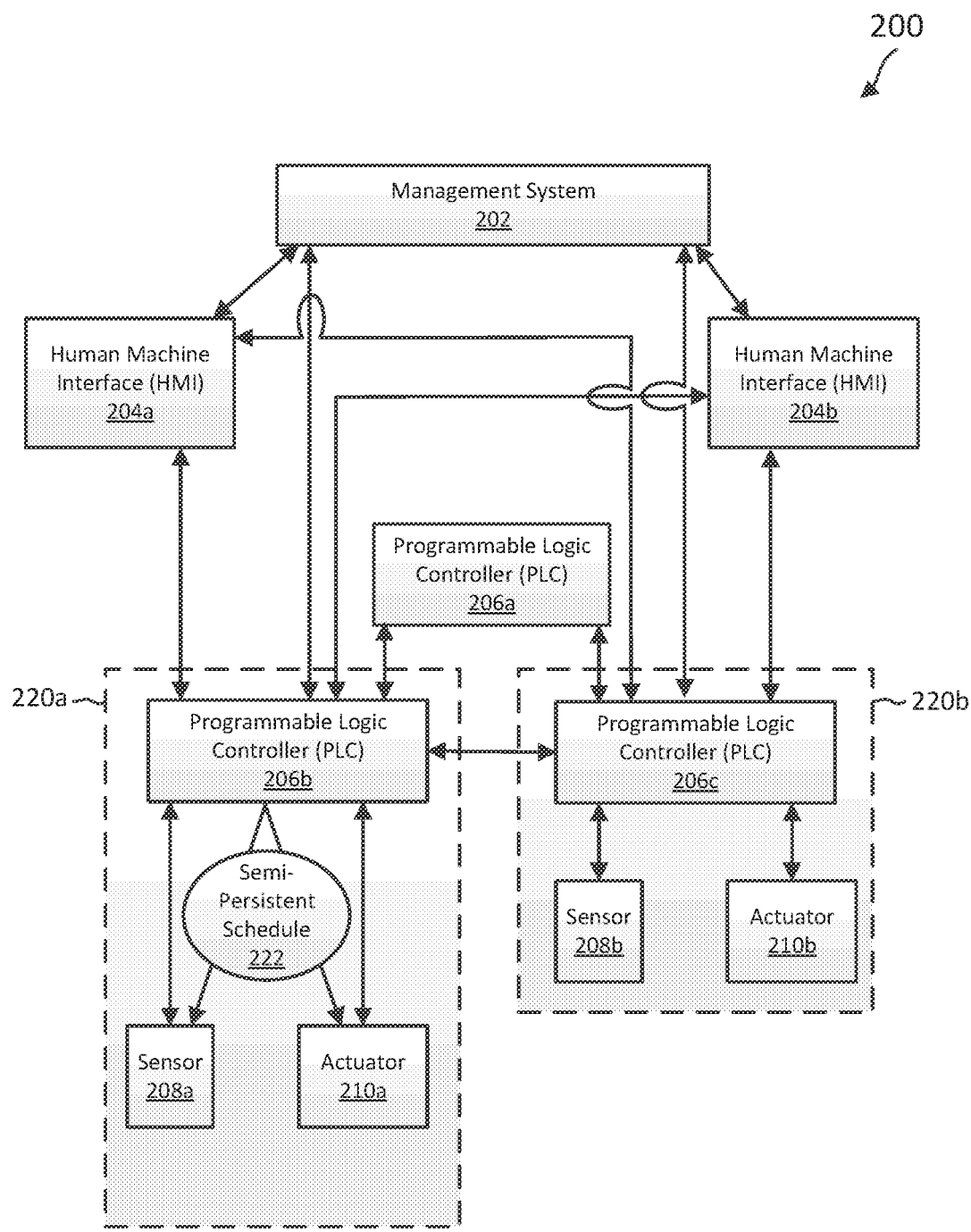
FIG. 2 illustrates a wireless factory automation network according to one or more embodiments of the present disclosure.

The network 100 in FIG. 1 may include an example wireless factory automation network 200 as shown in FIG. 2, according to one or more embodiments of the present disclosure. The network 200 includes a management system 202, human machine interfaces (HMIs) 204a and 204b, programmable logic controllers (PLCs) 206a, 206b, and 206c, sensors 208a and 208b, and actuators 210a and 210b. With reference to FIG. 1, the BS 105f may be the PLC 206a, 206b, or 206c that controls the sensors and actuators, and the UE 115f, 115g may be a sensor and actuator (e.g., a rotary motor, a position sensor, etc.). The management system 202 may be an industrial personal (PC) that provides controller programming, software and security management, and/or long-term key performance indicator (KPI) monitoring. The management system 202 may communicate with the HMIs 204a and 204b and the PLCs 206a, 206b, and 206c. A HMI may be, for example, a tablet, panel, or human-wearable device. In an example, the HMI may be a machine on the floor that starts or stops a process or object or changes a mode of a device from a first mode to a second mode.

Wireless factory automation is an application area with demanding communication specifications. Mission-critical traffic corresponds to cyclic exchanges among PLCs, sensors, and/or actuators. A factory may include hundreds or thousands of production cells, although it should be understood that a factory may include considerably more or fewer cells. In an example, a cell size may be 10×10×3 meters, and each cell may cover 20-50 nodes. The communications between the PLC 206b and the sensor 208a and actuator 210a within a dashed outline 220a and between the PLC 206c and the sensor 208b and actuator 210b within a dashed outline 220b may be subject to stringent latency and reliability requirements. Latency may be considered end-to-end in factory automation, where one end may be formed by sensors measuring data and providing the data to a PLC. The PLC may include logic to process the collected sensor data and instruct actuators forming the other communication end. In an example, a round-trip time (RTT) requirement between the PLC and a sensor or actuator may be about 0.5 to about 10 milliseconds (ms), and a RTT requirement between PLCs may be between about 4-10 ms. A PLC may be custom hardware that, for example, issues a series of commands (e.g., motion commands) and receives sensor inputs (e.g., position information) in real-time and/or coordinates with other PLCs.

In additional to the low-latency requirement, wireless factory automation may also demand ultra-reliable transmission. For mission-critical traffic corresponding to communications from the PLC to a sensor or actuator, the packet sizes may be restricted to about 40-256 bytes and have a packet error rate (PER) target of about $10^{-6}$. Additionally, the communication range may be about 10-15 meters and can be as high as about 100 meters. For inter-PLC communications, however, the packet sizes may be restricted to about 1 kilobyte (KB) and have a PER target of about $10^{-6}$. Additionally, the communication range is typically about 100 meters. The latency and reliability specifications are examples.

Mission-critical traffic corresponds to cyclic exchanges among the BS (e.g., PLCs) and the group of UEs (e.g., sensors and actuators). CoMP techniques (e.g., coordinated joint transmission (CJT)-multi-user (MU) may be used to improve network reliability by, for example, enhancing data channel capacity and reliability. For example, with the CoMP technique, communications may be transmitted from multiple transmission points. Accordingly, the likelihood of one channel being of high quality is higher with multiple transmissions and accordingly reliability may be improved. The network 200 includes a group of UEs (e.g., sensor 208a, actuator 210a, sensor 208b, and actuator 210b), and the CJT-MU is ineffective due to user-grouping constraints. Although the network 200 is described as a factory automation network, this is not intended to be limiting and the network 200 may be any network having a deterministic and periodic traffic profile.

A constraint in the network 200 may be an amount of capacity on the PDCCH, which carries resource allocations for both the DL and UL shared channels (e.g., PDSCH and PUSCH). A resource allocation may be carried as DL control information (DCI), and the size of the DCI may depend on factors such as whether the transmission is a UL or a DL transmission. Additionally, the PDCCH is limited in size (e.g., 3 OFDM symbol times), and the number of DCIs that can be carried in a subframe (e.g., 1 ms) may be limited. Accordingly, the number of UEs that can receive a resource allocation for a subframe may be limited, and the reliable PDCCH capacity may be a bottleneck in the system.

It may be desirable to reduce the control overhead by reducing the data carried in the PDCCH. The traffic profile in the wireless factory automation network 200 may be deterministic and periodic. To support more resource allocations in a network with period traffic, transmissions may be scheduled based on a semi-persistent schedule (SPS), potentially keeping the PDCCH capacity requirements low. In some examples, the BS (e.g., PLC 206b) transmits a SPS 222 for communicating with a group of UEs (e.g., sensor 208a and actuator 210a), the SPS including a plurality of resource allocations spaced apart in time. The plurality of resource allocations may be spaced apart in time in accordance with a time interval of, for example, about 40 ms. In this example, the plurality of resources is allocated every 40 ms for each UE in the group of UEs. The BS may transmit the SPS 222 via a RRC configuration message.

The SPS 222 may be valid for a number of transmissions or a certain duration. The BS may activate the SPS by transmitting the SPS to the group of UEs. The BS may deactivate the SPS by transmitting an indication to deactivate the SPS. In an example, the BS provides the indication to deactivate a current SPS by transmitting a different SPS to the UE. The activation and deactivation of a SPS may occur less frequently than traffic transmissions because the SPS may not be expected to change very often. By transmitting the SPS 222, it may be unnecessary to provide each UE with the resource allocations in the PDCCH for each transmission. Accordingly, the use of the SPS 222 may reduce control overhead and keep the PDCCH capacity requirements low.

Additionally, to avoid collisions when communicating in a shared or an unlicensed spectrum, a node (e.g., a BS 105 or UE 115) may perform LBT to ensure that the shared channel is clear before transmitting a signal in the shared channel A transmitting node may listen to one or more channels (e.g., frequency subbands) within the frequency spectrum. Depending on the LBT result, the transmitting node may access one or more channels. In some instances, the transmitting node may listen to different channels depending on whether the LBT is for a UL channel access or for a DL channel access. In an example, the BS desires to transmit a SPS packet including a SPS-based transmission to a group of UEs, and the transmission of the SPS-based transmission is preceded by a LBT to reserve a TXOP. If the LBT results in a LBT fail, the BS may be unable to transmit the SPS packet at or before the scheduled SPS time. For example, the channel may be occupied from a high-priority access. If a slot duration is 0.5 ms and the overall latency constraint is about 5-10 ms, there may be sufficient time to transmit the SPS packet and satisfy the latency constraint. If the latency constraints allow and the BS performs another LBT that passes, the BS may schedule the SPS packet for transmission in a later TXOP (e.g., the next TXOP). If other traffic (e.g., a prescheduled SPS) has already been scheduled in the later TXOP, it may be desirable to preempt one or more of the already scheduled resource allocations to accommodate one or more missed resource allocations of the plurality of resource allocations associated with the failed LBT. The present disclosure provides techniques for indicating SPS scheduling. Mechanisms for determining scheduling and/or a transmission timeline in accordance with such are described in greater detail herein.

Figure 3:
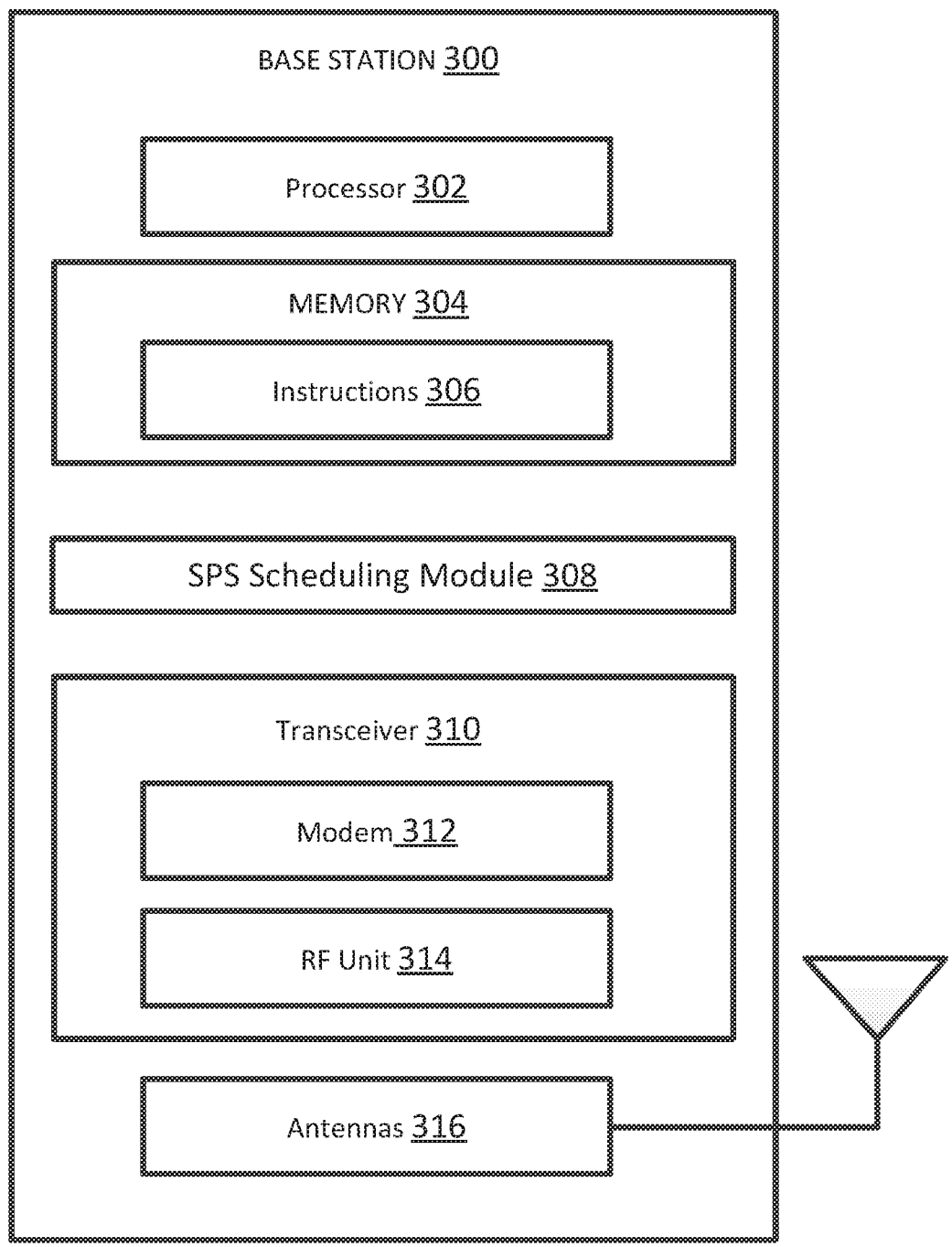
FIG. 3 is a block diagram of an exemplary base station (BS) according to one or more embodiments of the present disclosure.

FIG. 3 is a block diagram of an exemplary BS 300 according to one or more embodiments of the present disclosure. The BS 300 may be a BS 105, as discussed above. As shown, the BS 300 may include a processor 302, a memory 304, a SPS scheduling module 308, a transceiver 310 including a modem subsystem 312 and a radio frequency (RF) unit 314, and one or more antennas 316. These elements may be in direct or indirect communication with each other, for example via one or more buses.

The processor 302 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid-state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the BS 105 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SPS scheduling module 308 may be implemented via hardware, software, or combinations thereof. For example, the SPS scheduling module 308 may be implemented as a processor, circuit, and/or instructions 306 stored in the memory 304 and executed by the processor 302. The SPS scheduling module 308 may be used for various aspects of the present disclosure.

The SPS scheduling module 308 is configured to transmit a SPS for communicating with a group of wireless communication devices, the SPS including a plurality of resource allocations spaced apart in time. The group of wireless communication devices may be a group of UEs. The plurality of resource allocations may include frequency-time domain resources. In an example, the SPS 222 may be a DL SPS including a plurality of DL resource allocations spaced apart in time. The DL SPS may specify a frequency subband and an indication of when a wireless communication device of the group of wireless communication devices should monitor the frequency subband for DL transmissions from the BS. In another example, the SPS 222 may be a UL SPS including a plurality of UL resource allocations spaced apart in time. The UL SPS may specify a frequency subband and an indication of when a wireless communication device of the group of wireless communication devices may transmit a UL transmission to the BS.

The SPS scheduling module 308 may be configured to identify a first resource allocation for at least a subset of the group of wireless communication devices based on a missed resource allocation of the plurality of resource allocations associated with a failed LBT. In an example, the BS is unable to reserve a first TXOP based on the failed LBT. The BS may perform another LBT to reserve a second TXOP. The BS may have already scheduled the first resource allocation for transmission during the second TXOP. The SPS scheduling module 308 may preempt one or more of the already scheduled resource allocations (e.g., the first resource allocation) to accommodate one or more missed resource allocations included in the SPS. The SPS scheduling module 308 may be configured to communicate with at least the subset of the group of wireless communication devices, communication signals based on the first resource allocation.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data from the memory 304 and/or the SPS scheduling module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 300 to enable the BS 300 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices and provide the received data messages for processing and/or demodulation at the transceiver 310. The antennas 316 may include multiple antennas of similar or different designs to sustain multiple transmission links. The RF unit 314 may configure the antennas 316.

Figure 4:
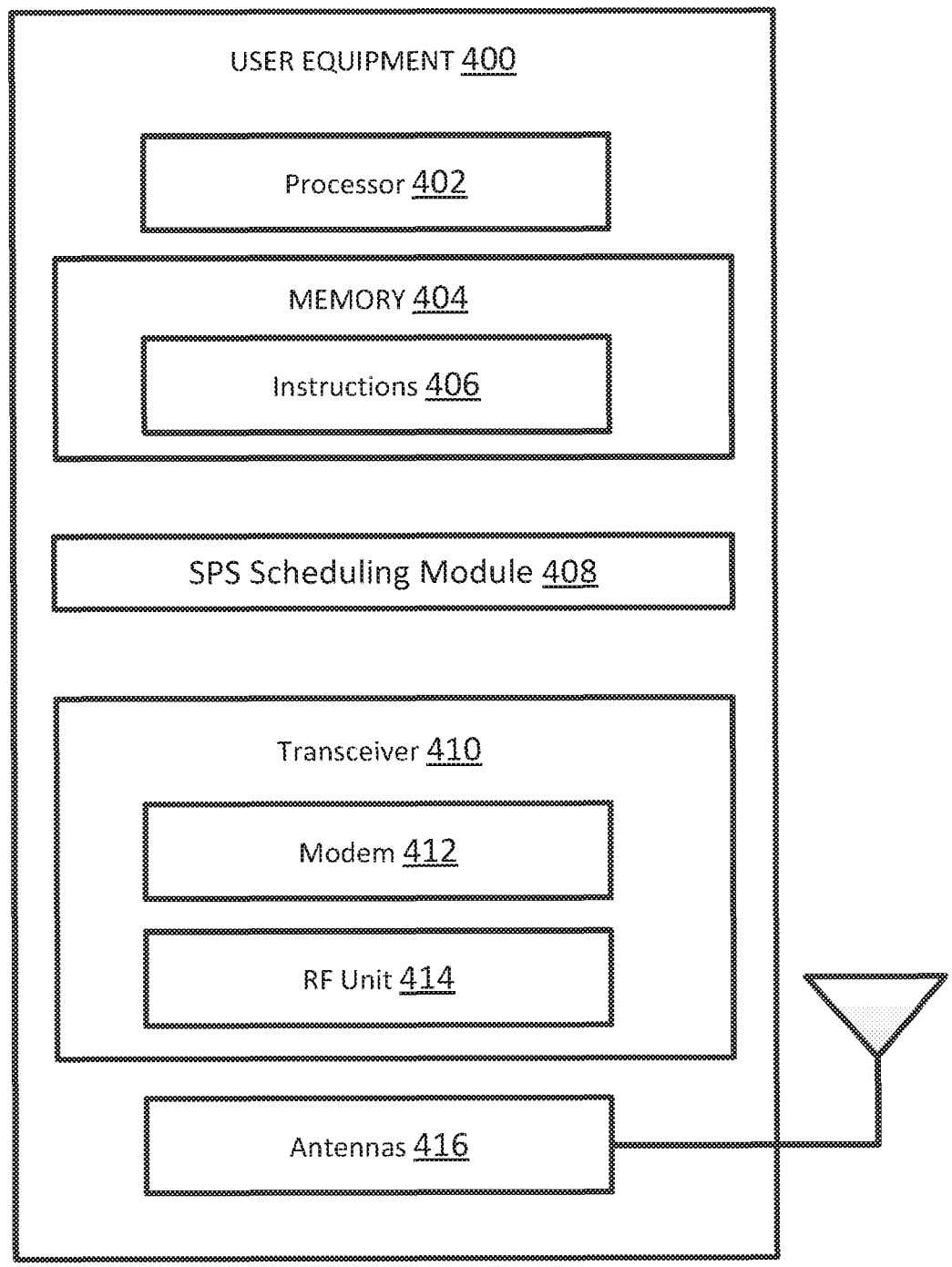
FIG. 4 is a block diagram of an exemplary user equipment (UE) according to one or more embodiments of the present disclosure.

FIG. 4 is a block diagram of an exemplary UE 400 according to one or more embodiments of the present disclosure. The UE 400 may be a UE 115 as discussed above. As shown, the UE 400 may include a processor 402, a memory 404, a SPS scheduling module 408, a transceiver 410 including a modem subsystem 412 and a RF unit 414, and one or more antennas 416. These elements may be in direct or indirect communication with each other, for example via one or more buses.

The processor 402 may include a CPU, a DSC, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform operations described herein with reference to the UE 115 in connection with embodiments of the present disclosure. Instructions 406 may also be referred to as code, which may be interpreted broadly to include any type of computer-readable statement(s) as discussed above with respect to FIG. 3.

The SPS scheduling module 408 may be implemented via hardware, software, or combinations thereof. For example, the SPS scheduling module 408 may be implemented as a processor, circuit, and/or instructions 406 stored in the memory 404 and executed by the processor 402. The SPS scheduling module 408 may be used for various aspects of the present disclosure.

The SPS scheduling module 408 is configured to receive a SPS for communicating with a group of wireless communication devices, the SPS including a plurality of resource allocations spaced apart in time. The SPS scheduling module 408 may receive the SPS from a BS. The plurality of resource allocations may include frequency-time domain resources. Additionally, the SPS scheduling module 408 may be configured to identify a first resource allocation for at least a subset of the group of wireless communication devices based on a missed resource allocation of the plurality of resource allocations associated with a failed LBT. The first resource allocation may be a UL resource allocation or a DL resource allocation. The SPS scheduling module 408 may be configured to communicate with at least the subset of the group of wireless communication devices, communication signals based on the first resource allocation.

As shown, the transceiver 410 may include the modem subsystem 412 and the RF unit 414. The transceiver 410 can be configured to communicate bi-directionally with other devices, such as the BSs 105 and/or another core network element. The modem subsystem 412 may be configured to modulate and/or encode the data from the memory 404 and/or the SPS scheduling module 408 according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The antennas 416 may include multiple antennas of similar or different designs to sustain multiple transmission links. The RF unit 414 may configure the antennas 416.

Figure 5:
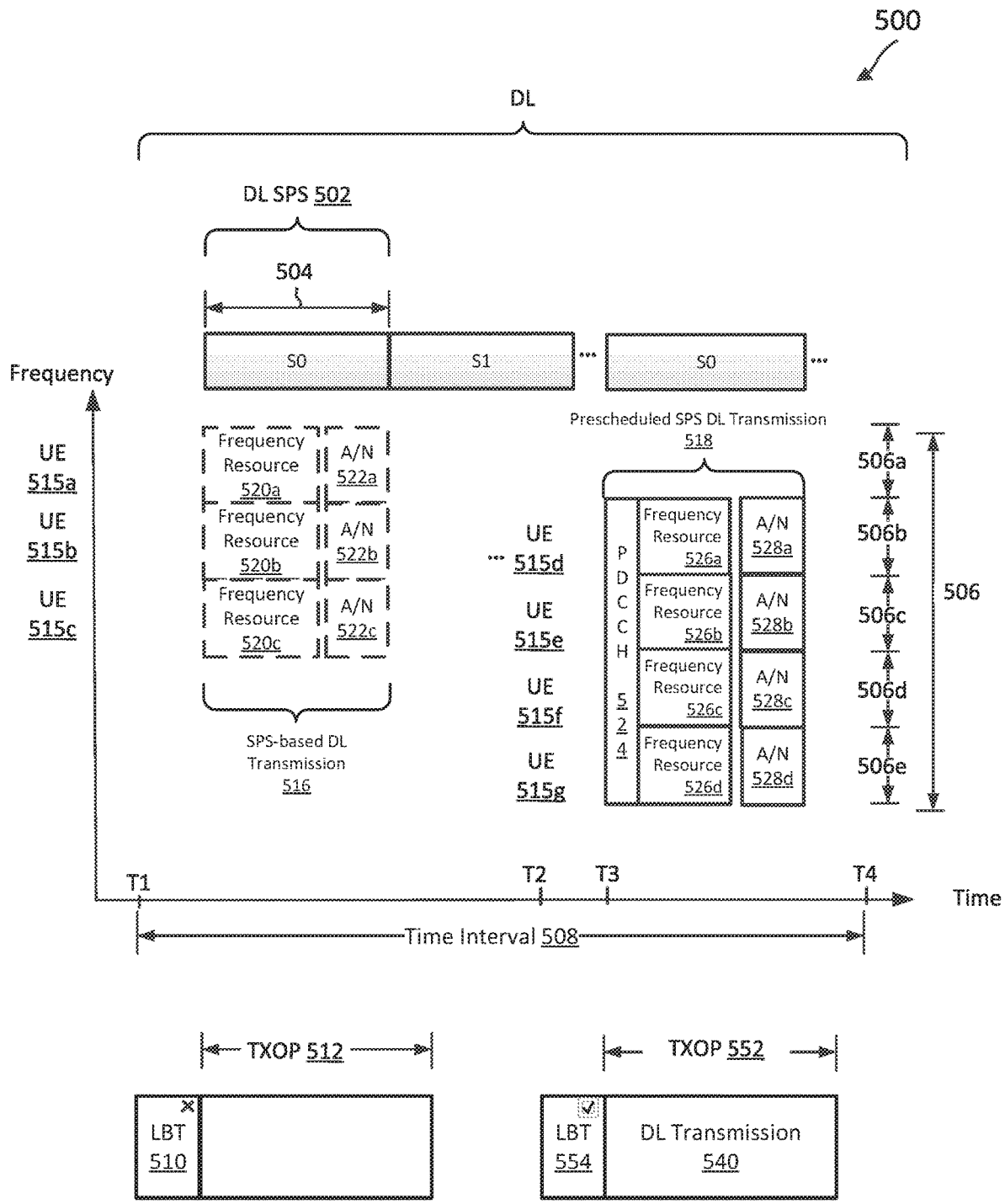
FIG. 5 illustrates a scheduling scheme in accordance with a downlink (DL) semi-persistent schedule (SPS) according to embodiments of the present disclosure.

FIG. 5 illustrates a scheduling scheme 500 in accordance with a DL SPS according to embodiments of the present disclosure. The scheduling scheme 500 may correspond to a DL SPS communicated by a BS to a group of UEs. The DL SPS may satisfy the low-latency constraints whenever feasible and keep PDCCH capacity requirements low. In FIG. 5, the x-axis represents time in some constant units, and the y-axis represents frequency in some constant units. FIG. 5 shows a plurality of slots 504 in time. The slots 504 are indexed from S0 to Si and may include additional slots. A BS may communicate with a UE in units of slots 504. The slots 504 may also be referred to as TTIs. Each slot 504 or TTI may carry a medium access control (MAC) layer transport block. Each slot 504 may include a number of symbols in time and a number of frequency tones in frequency.

Figure 6:
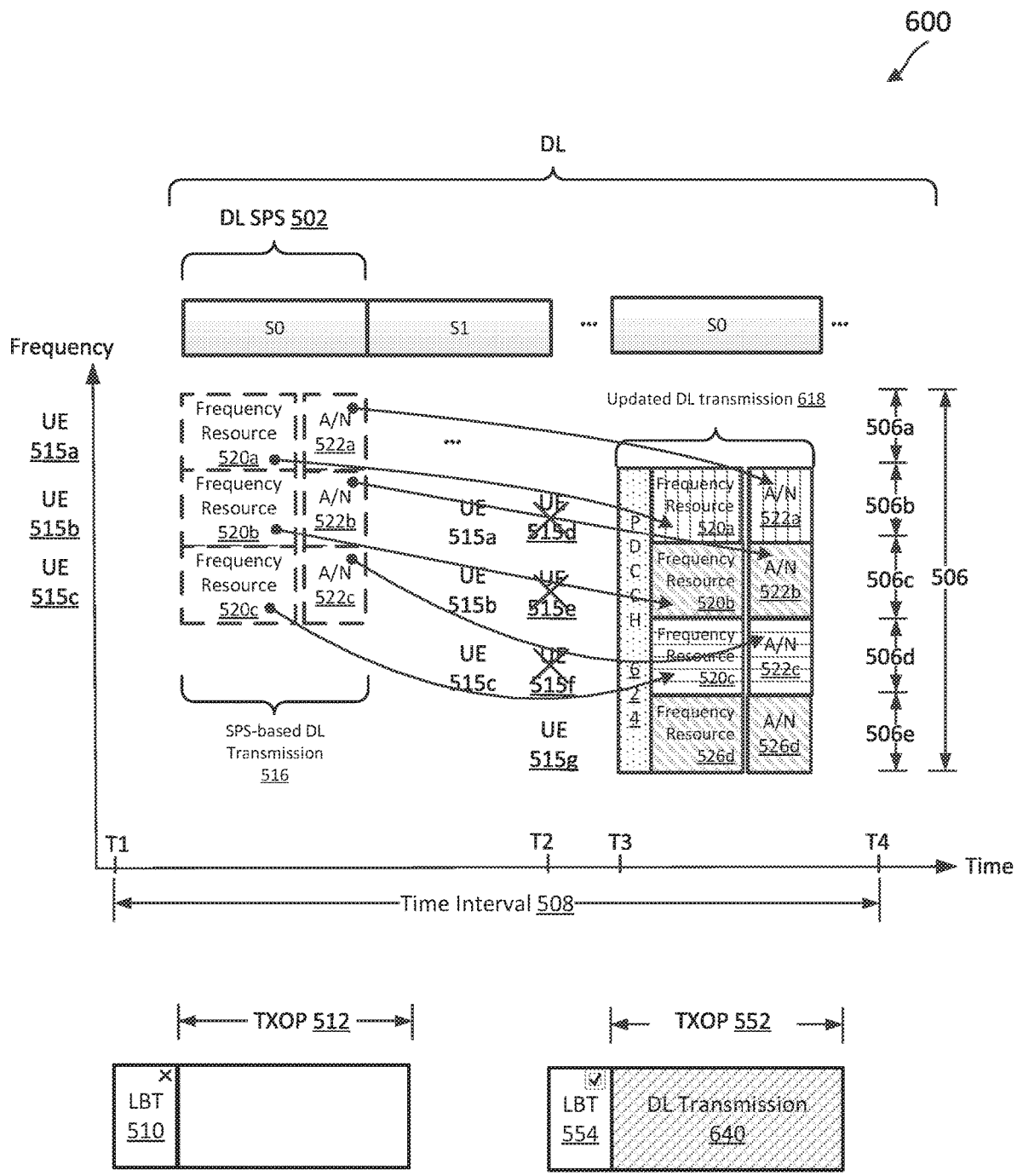
FIG. 6 illustrates a scheduling scheme for preempting DL resource allocations in a current schedule based on a failed listen-before-talk (LBT) according to embodiments of the present disclosure.
Figure 7:
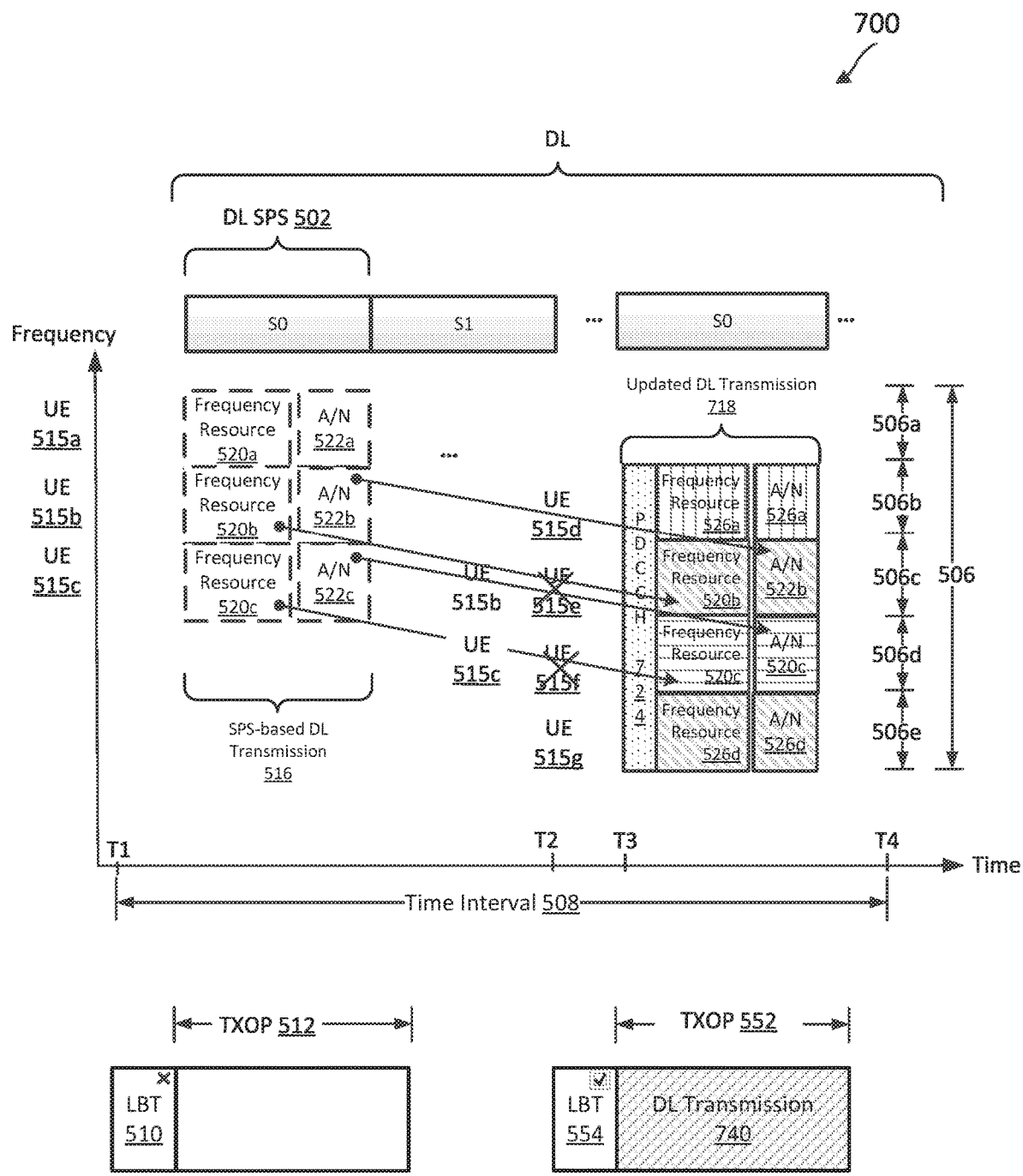
FIG. 7 illustrates a scheduling scheme for preempting DL resource allocations in a current schedule based on a failed LBT according to embodiments of the present disclosure.

The pattern-filled boxes represent transmissions of DL control information, DL data, UL data, an acknowledgement (ACK), and/or a negative-ACK (NACK) in corresponding slots 504 (see FIGS. 6 and 7). While an entire slot 504 is pattern-filled, a transmission may occur only in a corresponding portion of the slot 504. A slot 504 may include a DL control portion followed by at least one of a subsequent DL data portion, a UL data portion, and/or a UL control portion. Additionally, a slot may include a DL data portion, a UL data portion, and/or a UL control portion that does not follow a DL control portion. In the context of LTE and NR, the DL control portion, the DL data portion, the UL data portion, and the UL control portion may be referred to as a PDCCH, PDSCH, PUSCH, and PUCCH, respectively. Additionally, boxes having with the same pattern correspond to the same UE.

A frequency band 506 includes a plurality of resource blocks, frequency subcarriers, or a plurality of frequency subbands. The frequency band 506 is partitioned into frequency subbands 506a-506e. Each frequency subband may include one or more frequency resources (e.g., in units of resource blocks or frequency subcarriers). The BS may assign one or more subbands from the unlicensed frequency band 506 to one or more UEs. In an example, 20-50 UEs may correspond to actuators and sensors in a factory area, and the UEs may be scheduled over one or more timeslots, depending on the latency requirements, for periodic data exchanges. The number of UEs per time slot may be determined accordingly.

In the example illustrated in FIG. 5, the BS is aware of the traffic profile, which may be periodic and deterministic. Before time T1, the BS transmits a DL SPS 502 for communicating with a group of UEs 515a-515c, and the DL SPS 502 includes a plurality of DL resource allocations spaced apart in time. The plurality of DL resource allocations may be time-frequency domain resources. The DL SPS 502 may specify that the frequency subband 506a is assigned to the UE 515a, the frequency subband 506b is assigned to the UE 515b, and the frequency subband 506c is assigned to the UE 515c. Additionally, the DL SPS 502 may specify that the plurality of DL resource allocations will be spaced apart in time in accordance with a time interval 508 (e.g., 40 ms). A UE monitors an assigned DL frequency subband in accordance with the time interval 508 for DL transmissions from the BS. Moreover, the time interval 508 applies to the entire group of UEs 515a-515c specified in the DL SPS 502, providing for group signaling that saves spectrum resources compared to signaling for each UE in the group. Accordingly, the BS and the group of UEs 515a-515c are aware of upcoming packet transmission requirements and know, based on the DL SPS 502, which and where DL resources may be utilized.

A SPS-based DL transmission 516 in accordance with the DL SPS 502 uses a DL frequency resource 520a in a frequency subband 506a assigned to the UE 515a, a DL frequency resource 520b in a frequency subband 506b assigned to the UE 515b, and a DL frequency resource 520c in a frequency subband 506c assigned to the UE 515c. A first DL resource allocation of the plurality of resource allocations may indicate the frequency resource 520a, a second DL resource allocation of the plurality of resource allocations may indicate the frequency resource 520b, and a third DL resource allocation of the plurality of resource allocations may indicate the frequency resource 520c, the plurality of resource allocations being included in the DL SPS 502.

Additionally, the SPS-based DL transmission 516 includes feedbacks from the group of UEs 515a-515c based on DL data (e.g., frequency resources) previously transmitted by the BS. The BS transmits DL data to the group of UEs 515a-515c specified in the DL SPS 502. In turn, each UE specified in the DL SPS 502 may transmit a feedback for the DL data to the BS. The DL data and the feedback for the DL data may be provided in the same TXOP or different TXOPs. The feedback may be an ACK indicating that reception of the DL data by the UE is successful or may be a NACK indicating that reception of the DL data by the UE is unsuccessful (e.g., including an error, failing an error correction, or without receiving UL data as expected based on the SPS). The feedback may be indicated by an ACK/NACK or A/N in the examples. The A/N may be indicated by one bit. In some instances, the A/N may be indicated by a predetermined sequence. For example, the UE 515a may transmit in the frequency subband 506a, an A/N 522a for DL data previously transmitted from the BS to the UE 515a, the UE 515b may transmit in the frequency subband 506b, an A/N 522b for DL data previously transmitted from the BS to the UE 515b, and so on.

Fewer or more resource allocations and/or frequency resources are within the scope of the disclosure. The group of UEs 515a-515c receives the DL SPS 502 and may be accordingly informed of when to monitor an assigned frequency subband and which resources will be used by a UE for receiving a DL transmission from the BS and/or for providing a feedback for DL data to the BS.

Reservation of a TXOP is not deterministic in the unlicensed frequency band 506, and due to the uncertain nature or contentious nature of the unlicensed frequency band 506, the BS may initiate a LBT 510 in accordance with the timeline 508. A SPS time may refer to a time at which to transmit a SPS-based DL transmission in accordance with the DL SPS. In an example, the time interval 508 is 40 ms, and a first SPS time may be at time T1 (e.g., 2 ms) and a second SPS time may be at time T4 (e.g., 42 ms), where 40 ms has elapsed from time T1 to time T4. At time T4, the allocation of the DL frequency resources 520a-520c are repeated based on the DL SPS 502.

At SPS time T1, the BS performs the LBT 510 to detect whether the BS can reserve the unlicensed frequency band 506 for the DL transmission. The determination of whether the BS may reserve the unlicensed frequency band 506 depends on various factors such as the activity in the unlicensed frequency band 506 by other communication devices (e.g., an ongoing transmission by a communication device), transmission by higher priority network operating entities, etc. If the LBT 510 results in a LBT pass, the BS reserves a TXOP 512 for transmission of the SPS-based DL transmission 516. If the LBT 510 results in a LBT fail, as indicated by the "X" mark, the BS may back off and perform another LBT at a later point in time. Due to the failed LBT 510, the BS does not transmit the SPS-based DL transmission 516 (e.g., in the slot 504 indexed S0 starting at SPS time T1) during the TXOP 512, as indicated by the dashed lines around the frequency resources 520a-520c and the A/Ns 522a-522c. If the latency constraints allow, the BS may schedule a SPS packet including the SPS-based DL transmission 516 for a later TXOP.

At time T2, the BS performs a LBT 554 to reserve a TXOP 552. If the LBT 554 results in a LBT pass, as indicated by the checkmark, the BS reserves the TXOP 552 for sending a DL transmission 540. The BS may already have scheduled traffic (e.g., a prescheduled SPS DL transmission 518) for transmission during the TXOP 552, starting at about time T3. In some examples, the prescheduled SPS transmission may be based on the configured schedule and a SPS valid indication. A PDCCH 524 may include the SPS valid indication and/or other DL control information. In some examples, the prescheduled SPS DL transmission 518 does not include the PDCCH 524. The prescheduled SPS DL transmission 518 includes DL data transmissions using frequency resources 526a-526d and feedback from the UEs 515d-g on DL data (e.g., carried in the frequency resources) previously transmitted by the BS. The feedback includes A/Ns 528a-528d. The BS transmits a DL data signal to the UE in the slot 504 (e.g., in a DL data portion of the slot 504). The UE may receive the DL data signal (e.g., carried in the frequency resources).

The BS may identify one or more DL resource allocations in the next scheduled transmission (e.g., prescheduled SPS DL transmission 518) for at least a subset of the group of UEs 515a-515c based on the failed LBT 510. The BS may determine whether any of the resource allocations in the prescheduled SPS DL transmission 518 is preemptable and if so, preempt the resource allocation with a resource allocation included in the SPS-based DL transmission 516. A resource allocation may be indicated as preemptable during, for example, the RRC configuration or SPS activation. The BS may desire to preempt one or more resource allocations in the prescheduled SPS DL transmission 518 with one or more resource allocations included in the SPS-based DL transmission 516. The BS provides an indication to the group of UEs 515d-515g of whether the prescheduled SPS DL transmission 518 is valid for the current frame corresponding to the TXOP 552. Each frame, TXOP, slot, or subset of slots may carry an indicator (e.g., a broadcast or group DCI), where an indicator provides information on whether the prescheduled SPS DL transmission 518 is valid for that frame, TXOP, slot, or subset of slots, respectively. If the pre-scheduled SPS DL transmission 518 is indicated as invalid, all or preemptable parts of the previous resource allocations for the frame are assumed to be canceled. A resource allocation included in the pre-scheduled SPS DL transmission 518 may be indicated as preemptable, for example, during RRC configuration or SPS activation.

For any resource allocations included in the scheduled prescheduled SPS DL transmission 518 that have been canceled, the BS may notify the applicable UEs expecting the resource allocations of the cancelations. Accordingly, the BS may transmit an override signal to the UEs 515d, 515e, and/or 515f, the override signal indicating to the respective UEs that the frequency resources 526, 526b, and/or 526c originally allocated in the TXOP 552 have been overwritten. Additionally, the BS may notify the applicable UEs of the new resource allocations. In an example, the BS may transmit individual DCIs or a group of DCIs indicating canceled resource allocations to the appropriate UEs (e.g., UE 515d, UE 515e, and UE 515f) and/or new resource allocations to the appropriate UEs (e.g., UE 515a, UE 515b, and UE 515c).

A UE grouping for preemption of resource allocations may have been previously indicated (e.g., through RRC configuration or separate DCI). In an example, a UE grouping may be frame or slot based. For example, all UEs scheduled in a missed frame or slot may preempt the currently scheduled UEs, and the resource allocations for the preempting frame or slot may continue to apply because the entire frame has been preempted. In another example, the UE grouping is priority based (e.g., UEs may be assigned to priority classes and a specified subset of priority classes from the outstanding frames or slots (past and present) may be scheduled). In this example, explicit resource allocations may be included in the group DCI. Alternatively, the group DCI may include differential resource allocation information (e.g., resource allocations only for those UEs different from the previously indicated). The resource allocation information may be further compressed. (e.g., a common offset for a subset of UEs). A UE grouping may be based on one or more of these examples (e.g., frame-based and/or slot-based and priority-based). Accordingly, re-scheduling a SPS may be performed for a group of UEs (rather than only one UE) for a missed SPS opportunity (e.g., due to a missed TXOP), based on whole-frame and/or priority-class based override, which may be signaled through a group-DCI indicator for a specific payload in the group-DCI. As discussed, the number of UEs may be large (e.g., 50 UEs per cell). In an example, a small number of bits (e.g., one bit or more) may suffice for rescheduling a group of UEs.

In some examples, the BS may preempt at least some resource allocations included in the prescheduled SPS DL transmission 518 scheduled for transmission during the TXOP 552, with the entire SPS-based DL transmission 516. The SPS-based DL transmission 516 may be referred to as the missed or previous transmission in accordance with a previous schedule. The prescheduled SPS DL transmission 518 may be referred to as a currently scheduled transmission in accordance with a current schedule. In an example, the BS may identify the frequency resource 526a using a first resource allocation in the prescheduled SPS DL transmission 518 based on the failed LBT 510 and determine whether to preempt the first resource allocation with the missed frequency resource 520a for the UE 515a. The BS may preempt the frequency resource 526a and the A/N 528a assigned to the UE 515d with the missed frequency resource 520a and the A/N 522a assigned to the UE 515a, for transmission during the TXOP 552.

Additionally, the BS may identify the frequency resource 526b using a second resource allocation in the prescheduled SPS DL transmission 518 based on the failed LBT 510 and determine whether to preempt the second resource allocation with the missed frequency resource 520b for the UE 515b. The BS may preempt the frequency resource 526b and the A/N 528b assigned to the UE 515e with the missed frequency resource 520b and the A/N 522b assigned to the UE 515b, for transmission during the TXOP 552. Additionally, the BS may identify the frequency resource 526c using a third resource allocation in the prescheduled SPS DL transmission 518 based on the failed LBT 510 and determine whether to preempt the third resource allocation with the missed frequency resource 520c for the UE 515c. The BS may preempt the frequency resource 526c and the A/N 528c assigned to the UE 515f with the missed frequency resource 520c and the A/N 522c assigned to the UE 515c, for transmission during the TXOP 552.

The BS may preempt the first, second, and third resource allocations included in the prescheduled SPS DL transmission 518 with the first, second, and third resource allocations included in the SPS-based DL transmission 516 (as discussed above), resulting in an updated DL transmission 618, as shown in FIG. 6.

FIG. 6 illustrates a scheduling scheme 600 for preempting DL resource allocations in a current schedule based on a failed LBT according to embodiments of the present disclosure. In FIG. 6, the updated DL transmission 618 includes new resource allocations, as discussed above. The BS transmits a DL transmission 640 including the updated DL transmission 618, during the TXOP 552. The updated DL transmission 618 is based on PDCCH scheduling in terms of the DL frequency resource allocations being indicated in a PDCCH 624. The updated DL transmission 618 includes the PDCCH 624 based on the BS's assignment of DL frequency resources to the updated group of UEs 515a-515c. The updated DL transmission 618 also includes the initial frequency resource 526d for the UE 515g. The PDCCH 624 may include DCI indicating a DL grant for each of the UEs 515a-515c and 515g in the same slot 504 indexed S0.

The BS may cancel the preempted DL resource allocations in the prescheduled SPS DL transmission 518 (see FIG. 5) for UEs 515d-515f and provide an indication of the canceled resource allocations to the UEs 515d-515f. The BS may provide an individual DCI to each UE 515d-515f or may provide a group DCI to the UEs 515d-515f to indicate the canceled resource allocations, which were preempted by the resource allocations for the UEs 515a-515c. Accordingly, the BS may provide the indication of the canceled resource allocation by transmitting an override signal to the UEs 515d, 515e, and/or 515f, the override signal indicating that the frequency resources 526a, 526b, and/or 526c have been canceled, and therefore to not transmit corresponding A/Ns 528a, 528b, and/or 528c, respectively. For example, the BS may transmit to the UEs 515d, 515e, and/or 515f, an override signal indicating cancellation of a feedback (e.g., A/N 528a, 528b, and/or 528c) associated with a second resource allocation (e.g., frequency resource 526a, 526b, and/or 526c), the second resource allocation being scheduled for transmission during a TXOP (e.g., TXOP 552) and being preempted by the first resource allocation (e.g., frequency resource 520a, 520b, and/or 520c) during the TXOP. Additionally, the BS may allocate new DL resource allocations for the group of UEs 515a-515c and provide an indication of the new resource allocations to the UEs 515a-515c. The BS may provide an individual DCI to each UE 515a-515c or may provide a group DCI to the UEs 515a-515c to indicate the new resource allocations in the updated DL transmission 618.

The BS transmits a DL data signal to the UE in the slot 504 indexed S0 (e.g., in a DL data portion of the slot 504). Each UE may receive the DCI indicating the DL grant and receive the DL data signal (e.g., frequency resources) based on the DL grant. The updated DL transmission 618 also includes the original frequency resource 526d for the UE 515g and feedback from the group of UEs 515a-515c and 515g on DL data (e.g., frequency resources) previously transmitted by the BS.

In FIG. 6, boxes having the same patterns may be associated with the same UE. For example, at about time T3 the BS transmits communication signals using the frequency resource 520a and the A/N 522a in the frequency subband 506b to the UE 515a, transmits communication signals using the frequency resource 520b and the A/N 522b in the frequency subband 506c to the UE 515b, and transmits communication signals using the frequency resource 520c and the A/N 522c in the frequency subband 506d to the UE 515c. Additionally, the BS transmits communication signals using the frequency resource 526d and the A/N 526d in the frequency subband 506e to the UE 515g. The BS may concurrently or simultaneously transmit DL signals using the frequency resources in the updated DL transmission 618 to the group of UEs 515a-515c, in their respectively assigned frequency subbands, in the slot 504 indexed S0 based on the DL assignment to the group of UEs 515a-515c. If a UE 515a, 515b, or 515c fails LBT and does not transmit UL signals using a resource allocation included in the updated UL transmission 618, the BS may reschedule the missed resource allocation for a subsequent TXOP.

In FIG. 6, the BS transmits DL signals using all the resource allocations included in the missed SPS-based DL transmission 516, during the TXOP 552. In some examples, rather than using all the resource allocations included in the missed SPS-based transmission during the TXOP 552, the BS may transmit a portion of the missed SPS-based transmission during the TXOP 552. The BS may preempt one or more resource allocations included in the prescheduled SPS DL transmission 518 with a subset of resource allocations included in the SPS-based DL transmission 516 (as discussed above), resulting in an updated DL transmission 718, as shown in FIG. 7.

FIG. 7 illustrates a scheduling scheme 700 for preempting DL resource allocations in a current schedule based on a failed LBT according to embodiments of the present disclosure. In FIG. 7, the updated DL transmission 718 includes new resource allocations relative to the prescheduled SPS DL transmission 518. The BS transmits a DL transmission 740 including the updated DL transmission 718, during the TXOP 552. The updated DL transmission 718 is based on PDCCH scheduling in terms of the DL frequency resource allocations being indicated in a PDCCH 724. The BS preempts the second and third resource allocations included in the prescheduled SPS DL transmission 518 with the second and third resource allocations included in the SPS-based DL transmission 516. For example, the BS preempts the frequency resource 526b and the A/N 528b assigned to the UE 515e with the missed frequency resource 520b and the A/N 522b assigned to the UE 515b and preempts the frequency resource 526c and the A/N 528c assigned to the UE 515f with the missed frequency resource 520c and the A/N 522c assigned to the UE 515c, but does not preempt other frequency resources included in the prescheduled SPS DL transmission 518. Accordingly, the updated DL transmission 718 includes DL transmission using the frequency resource 520b and the A/N 522b for the UE 515b and DL transmission using the frequency resource 520c and the A/N 522c for the UE 515c. The BS may provide an indication to the UEs 515b and 515c that the DL SPS 502 is valid for the TXOP 552 and provide an indication to the UE 515*a* that the DL SPS 202 is not valid for the TXOP 552. Additionally, the BS may provide an indication to the UE 515*e* and 515*f* that the originally assigned resource allocations included in the prescheduled SPS DL transmission 518 have been canceled.

Figure 8:
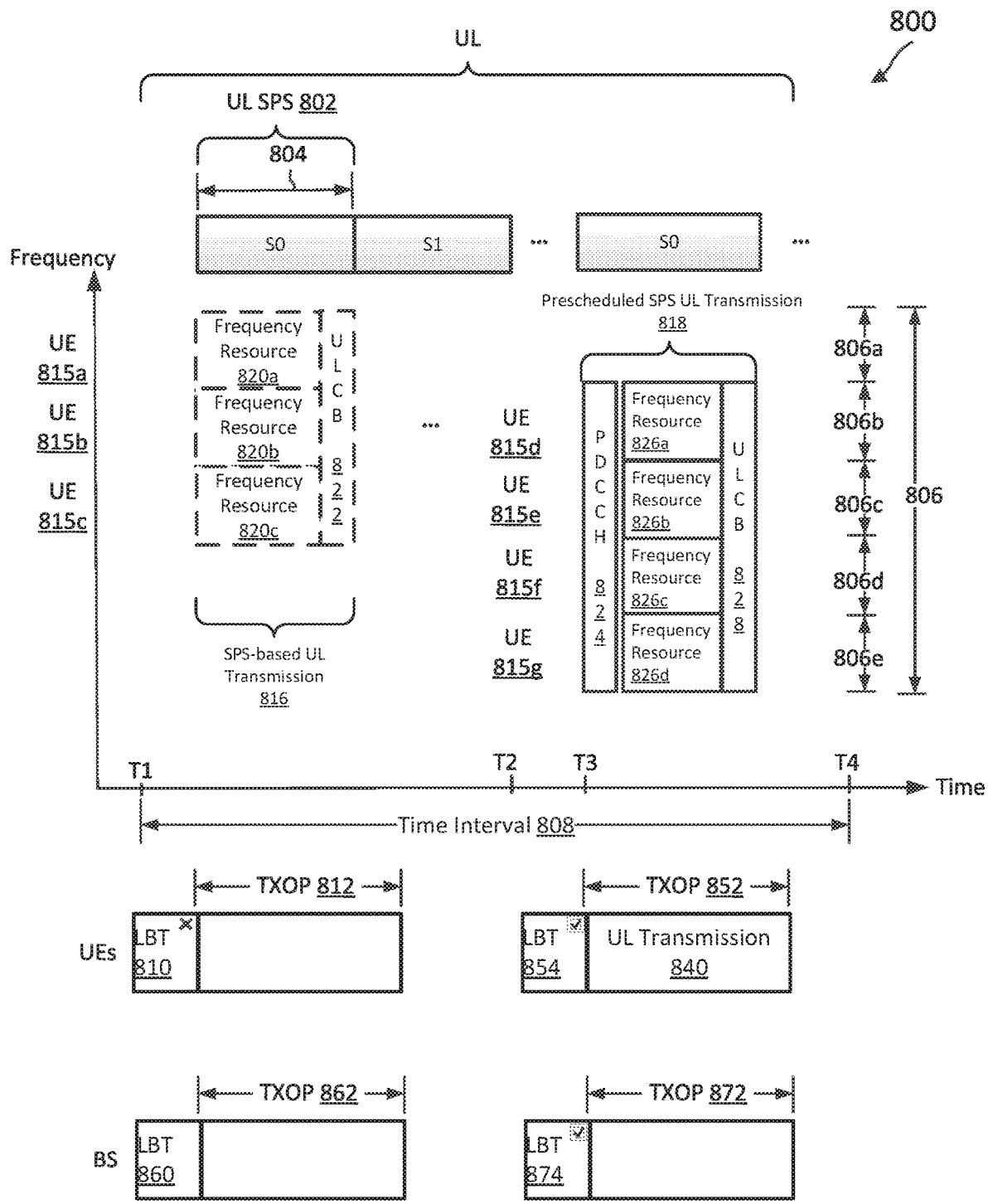
FIG. 8 illustrates a scheduling scheme in accordance with an uplink (UL) SPS according to embodiments of the present disclosure.

FIG. 8 illustrates a scheduling scheme 800 in accordance with a UL SPS according to embodiments of the present disclosure. The scheduling scheme 800 may correspond to a UL SPS communicated by a BS to a group of UEs. The UL SPS may satisfy the low-latency constraints whenever feasible and keep PDCCH capacity requirements low. In FIG. 8, the x-axis represents time in some constant units, and the y-axis represents frequency in some constant units. FIG. 8 shows a plurality of slots 804 in time. The slots 804 are indexed from S0 to Si and may include additional slots. A BS may communicate with a UE in units of slots 804. The slots 804 may also be referred to as TTIs. Each slot 804 or TTI may carry a MAC layer transport block. Each slot 804 may include a number of symbols in time and a number of frequency tones in frequency.

A frequency band 806 includes a plurality of resource blocks, frequency subcarriers, or a plurality of frequency subbands. A frequency band 806 is partitioned into frequency subbands 806*a*-806*e*. Each frequency subband may include one or more frequency resources. The BS may assign one or more subbands from the unlicensed frequency band 806 to one or more UEs.

In the example illustrated in FIG. 8, the BS is aware of the traffic profile, which may be periodic and deterministic. Before time T1, the BS transmits a UL SPS 802 for communicating with a group of UEs 815*a*-815*c*, and the UL SPS 802 includes a plurality of UL resource allocations spaced apart in time. The plurality of UL resource allocations may be time-frequency domain resources. The UL SPS 802 may specify that the frequency subband 806*a* is assigned to the UE 815*a*, the frequency subband 806*b* is assigned to the UE 815*b*, and the frequency subband 806*c* is assigned to the UE 815*c*. Additionally, the UL SPS 802 may specify that the plurality of UL resource allocations will be spaced apart in time in accordance with a time interval 808 (e.g., 30 ms). The UE may use an assigned UL frequency subband in accordance with the time interval 808 for UL transmissions to the BS. Moreover, the time interval 808 applies to the entire group of UEs 815*a*-815*c* specified in the UL SPS 802, providing for group signaling that saves spectrum resources compared to signaling for each UE in the group. Accordingly, the BS and the group of UEs 815*a*-815*c* are aware of upcoming packet transmission requirements and know, based on the UL SPS 802, which and where UL resources may be utilized.

A SPS-based UL transmission 816 in accordance with the UL SPS 802 uses a UL frequency resource 820*a* in a frequency subband 806*a* assigned to the UE 815*a*, a UL frequency resource 820*b* in a frequency subband 806*b* assigned to the UE 815*b*, and a UL frequency resource 820*c* in a frequency subband 806*c* assigned to the UE 815*c*. A first UL resource allocation of the plurality of resource allocations indicates the frequency resource 820*a*, a second UL resource allocation of the plurality of resource allocations indicates the frequency resource 820*b*, and a third UL resource allocation of the plurality of resource allocations indicates the frequency resource 820*c*, the plurality of resource allocations being included in the UL SPS 802.

Additionally, the SPS-based UL transmission 816 includes a UL common burst (CB) 822 from the group of UEs 815*a*-815*c*. The ULCB 822 includes data/or and control information. In some instances, one or more UEs from the group of UEs 815*a*-815*c* may transmit UL control information in the ULCB 822. The UL control information may include scheduling requests (SRs) or buffer status reports (BSRs). Fewer or more resource allocations and/or frequency resources are within the scope of the disclosure. The group of UEs 815*a*-815*c* receives the UL SPS 802 and may be accordingly informed of when to use an assigned frequency subband and which resources will be used by a UE for sending UL transmissions to the BS.

Reservation of a TXOP is not deterministic in the unlicensed frequency band 806, and due to the uncertain nature or contentious nature of the unlicensed frequency band 806, the UE may initiate a LBT 810 in accordance with the timeline 808. A SPS time may refer to a time at which to transmit a SPS-based UL transmission in accordance with the UL SPS. In an example, the time interval 808 is 30 ms, and a first SPS time may be at time T1 (e.g., 5 ms) and a second SPS time may be at time T4 (e.g., 35 ms), where 30 ms has elapsed from time T1 to time T4. At time T4, the allocation of the UL frequency resources 820*a*-820*c* are repeated based on the UL SPS 802.

At SPS time T1, each UE in the group of UEs 815*a*-815*c* performs the LBT 810 to detect whether the respective UE can reserve the unlicensed medium (e.g., a corresponding subband) for the UL transmission. For example, the UE 815*a* performs a LBT in the frequency subband 806*a*, the UE 815*b* performs a LBT in the frequency subband 806*b*, and the UE 815*s* performs a LBT in the frequency subband 806*c*. The determination of whether a UE may reserve the unlicensed medium depends on various factors such as the activity in the unlicensed medium (e.g., a corresponding subband) by other communication devices (e.g., an ongoing transmission by a communication device), transmission by higher priority network operating entities, etc. If the UE 815*a*, 815*b*, or 815*c* passes the LBT 810, the corresponding UE reserves a TXOP 812 in a corresponding subband for transmission of the SPS-based UL transmission 816. If the UE 815*a*, 815*b*, or 815*c* fails the LBT 810, as indicated by the "X" mark, the corresponding UE may back off and perform another LBT at a later point in time (e.g., at a next UL SPS time).

Additionally, at about SPS time T1, the BS performs a LBT 860 to detect whether the BS can reserve the frequency subbands 806*a*, 806*b*, and 806*c* for the UL transmission. In an example, if the LBT 860 results in a LBT pass, the BS reserves a TXOP 862 for reception of the SPS-based UL transmission 816 from the group of UEs 815*a*-815*c*. If the BS does not detect a UL transmission from the UE 815*a*, 815*b*, or 815*c* during the TXOP 862, the BS may reschedule the one or more missed UEs for a UL transmission in a subsequent TXOP (e.g., a next TXOP 852, 872). In another example, if the LBT 860 results in a fail, the BS may not be able to receive the SPS-based UL transmission 816 from the group of UEs 815*a*-815*c*. If the latency constraints allow, the BS may schedule a SPS packet including the SPS-based UL transmission 816 for a later TXOP.

At time T2, each UE in the group of UE 815*a*-815*c* performs a LBT 854 to detect whether the respective UE can reserve a corresponding frequency subband for a UL transmission. If the UE 815*a*, 815*b*, or 815*c* passes the LBT 854, the corresponding UE reserves a TXOP 852 in a corresponding subband for transmission of the SPS-based UL transmission 816. Additionally, at about time T2, the BS performs a LBT 874 to detect whether the BS can reserve the frequency subbands 806*b*, 806*c*, 806*d*, and 806*e* for a DL/UL transmission. In an example, if the LBT 874 results in a LBT pass, the BS reserves a TXOP 872 for transmission of a DL signal and for reception of the SPS-based UL transmission 816 from at least a subset of the UEs 815a-81c.

To receive any missed UL transmissions, the BS may identify one or more UL resource allocations in a next scheduled transmission (e.g., prescheduled SPS UL transmission 818) for at least a subset of the group of UEs 815a-815c based on a failed LBT. The BS may determine whether any of the resource allocations included in the prescheduled SPS UL transmission 818 is preemptable and if so, preempt the resource allocation with a resource allocation included in the SPS-based UL transmission 816. The BS may desire to preempt one or more resource allocations included in the prescheduled SPS UL transmission 818 with one or more resource allocations included in the SPS-based UL transmission 816.

The BS may already have scheduled traffic (e.g., a prescheduled SPS UL transmission 818) for transmission during the TXOP 872, starting at about time T3. In some examples, the prescheduled SPS transmission may be based on the configured schedule and a SPS valid indication. A PDCCH 824 may include the SPS valid indication and/or other UL control information. In some examples, the prescheduled SPS UL transmission 818 does not include the PDCCH 824. The prescheduled SPS UL transmission 818 includes UL data transmissions using frequency resources 826a-826d and a ULCB 828. The BS transmits a DL data signal to the UE in the slot 804 (e.g., in a DL data portion of the slot 804). The UE may transmit the UL data signal (e.g., carried in the frequency resources).

The BS may identify one or more UL resource allocations in the next scheduled transmission (e.g., prescheduled SPS UL transmission 818) for at least a subset of the group of UEs 815a-815c based on the failed LBT 810 and/or failed LBT 860. The BS may determine whether any of the resource allocations in the prescheduled SPS UL transmission 818 is preemptable and if so, preempt the resource allocation with a resource allocation included in the SPS-based UL transmission 816. A resource allocation may be indicated as preemptable during, for example, the RRC configuration or SPS activation. The BS may desire to preempt one or more resource allocations in the prescheduled SPS UL transmission 818 with one or more resource allocations included in the SPS-based UL transmission 816. The BS provides an indication to the group of UEs 815d-815g of whether the prescheduled SPS UL transmission 818 is valid for the current frame corresponding to the TXOP 852, 872. Each frame, TXOP, slot, or subset of slots may carry an indicator (e.g., a broadcast or group DCI), where an indicator provides information on whether the prescheduled SPS UL transmission 818 is valid for that frame, TXOP, slot, or subset of slots, respectively. If the prescheduled SPS UL transmission 818 is indicated as invalid, all or preemptable parts of the previous resource allocations for the frame are assumed to be canceled. A resource allocation included in the prescheduled SPS UL transmission 818 may be indicated as preemptable, for example, during RRC configuration or SPS activation.

For any resource allocations included in the scheduled prescheduled SPS UL transmission 818 that have been canceled, the BS may notify the applicable UEs expecting to use the resource allocations of the cancelations. Additionally, the BS may notify the applicable UEs of the new resource allocations. In an example, the BS may transmit individual DCIs or a group of DCIs indicating canceled resource allocations and/or new resource allocations to the appropriate UEs.

In some examples, the BS may preempt at least some resource allocations included in the prescheduled SPS UL transmission 818 scheduled for transmission during the TXOP 852, 872, with the SPS-based UL transmission 816. The SPS-based UL transmission 816 may be referred to as the missed or previous transmission in accordance with a previous schedule. The prescheduled SPS UL transmission 818 may be referred to as a currently scheduled transmission in accordance with a current schedule. In an example, the BS may identify the frequency resource 826a using a first resource allocation in the prescheduled SPS UL transmission 818 based on a failed LBT (e.g., LBT 810 or LBT 860) and determine whether to preempt the first resource allocation with the missed frequency resource 820a for the UE 815a. The BS may preempt the frequency resource 826a assigned to the UE 815d with the missed frequency resource 820a assigned to the UE 815a, for transmission of a UL signal by the UE during the TXOP 852 and reception of the UL signal by the BS during the TXOP 872. Additionally, the BS may identify the frequency resource 826b using a second resource allocation in the prescheduled SPS UL transmission 818 based on a failed LBT and determine whether to preempt the second resource allocation with the missed frequency resource 820b for the UE 815b. The BS may preempt the frequency resource 826b assigned to the UE 815e with the missed frequency resource 820b assigned to the UE 815b, for transmission of a UL signal by the UE during the TXOP 852 and reception of the UL signal by the BS during the TXOP 872.

Additionally, the BS may identify the frequency resource 826c using a third resource allocation in the prescheduled SPS UL transmission 818 based on a failed LBT and determine whether to preempt the third resource allocation with the missed frequency resource 820c for the UE 815c. The BS may preempt the frequency resource 826c assigned to the UE 815f with the missed frequency resource 820c assigned to the UE 815c, for transmission of a UL signal by the UE during the TXOP 852 and reception of the UL signal by the BS during the TXOP 872. The BS may preempt the first, second, and third resource allocations included in the prescheduled SPS UL transmission 818 with the first, second, and third resource allocations included in the SPS-based UL transmission 816 (as discussed above), resulting in an updated UL transmission 918, as shown in FIG. 9.

Figure 9:
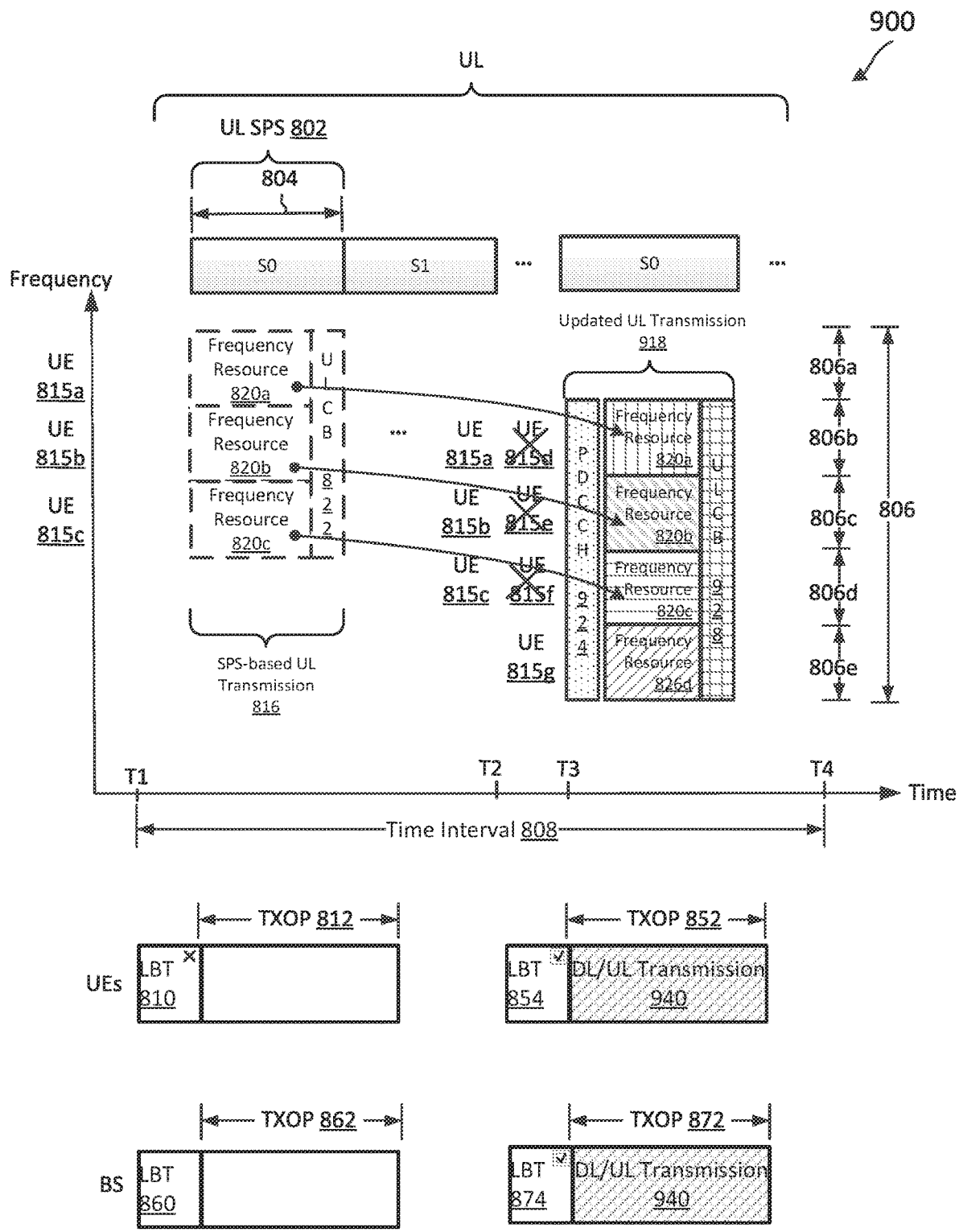
FIG. 9 illustrates a scheduling scheme for preempting UL resource allocations in a current schedule based on a failed LBT according to embodiments of the present disclosure.

FIG. 9 illustrates a scheduling scheme 900 for preempting UL resource allocations in a current schedule based on a failed LBT according to embodiments of the present disclosure. The updated UL transmission 918 includes new resource allocations and is based on PDCCH scheduling in terms of the UL frequency resource allocations being indicated in a PDCCH 924. The prescheduled SPS UL transmission 918 includes the PDCCH 924 based on the BS's assignment of UL frequency resources to the group of UEs 815a-815c. The updated UL transmission 918 also includes the initial frequency resource 826d for the UE 815g. The PDCCH 924 may include DCI indicating a UL grant for each of UEs 815a-815c and 815g in the same slot 504 indexed S0.

The BS may cancel the preempted UL resource allocations in the prescheduled SPS UL transmission (818 (see FIG. 8) for UEs 815d-815f and provide an indication of the canceled resource allocations to the UEs 815d-815f. The BS may provide an individual DCI to each UE 815d-815f or may provide a group DCI to the UEs 815d-815f to indicate the canceled resource allocations, which were preempted by the resource allocations for the UEs 815a-815c. Additionally, the BS may allocate new UL resource allocations for the group of UEs 815a-815c and provide an indication of the new resource allocations to the UEs 815a-815c. The BS may provide an individual DCI to each UE 815a-815c or may provide a group DCI to the UEs 815a-815c to indicate the new resource allocations in the updated UL transmission 918.

The group of UEs 815a-815c receives the DCI indicating the UL grant from the BS in the slot 804 indexed S0 (e.g., in a DL data portion of the slot 804). Each UE may receive the DCI indicating the UL grant and transmit the UL data signal (e.g., frequency resources) based on the UL grant. The updated UL transmission 918 also includes the original frequency resource 826d for the UE 815g. One or more UEs from the group of UEs 815a-815c and 815g may transmit UL control information in a ULCB 928.

In FIG. 9, boxes having the same patterns may be associated with the same UE. For example, during the TXOP 852, the UE 815a transmits communication signals using the frequency resource 820a in the frequency subband 806b to the BS, the UE 815b transmits communication signals using the frequency resource 820b in the frequency subband 806c to the BS, the UE 815c transmits communication signals using the frequency resource 820c in the frequency subband 806d to the BS, and the UE 815g transmits communication signals using the frequency resource 826d in the frequency subband 806e to the BS. The UEs 815a-815c may concurrently or simultaneously transmit UL signals using the frequency resources in the updated UL transmission 918 to the BS, in their respectively assigned frequency subbands, in the slot 804 indexed S0 based on the new UL assignment to the group of UEs 815a-815c. The BS receives the communication signals using the UL frequency resource 820a-820c and 826d from the group of UEs 815a-815c and 815g. If a UE 815a, 815b, 815c, or 815g fails LBT and does not transmit UL signals using a resource allocation included in the updated UL transmission 918, the BS may reschedule the missed resource allocation for a subsequent TXOP.

In FIG. 9, the group of UEs 815a-815c transmits UL signals using all the resource allocations included in the missed SPS-based UL transmission 816, during the TXOP 852. In some examples, rather than using all the resource allocations included in the missed SPS-based transmission during the TXOP 852, the BS may schedule a portion of the missed SPS-based UL transmission during the TXOP 852. The BS may preempt one or more resource allocations included in the prescheduled SPS UL transmission 818 with a subset of resource allocations included in the SPS-based UL transmission 816 (as discussed above), resulting in an updated UL transmission 1018, as shown in FIG. 10.

Figure 10:
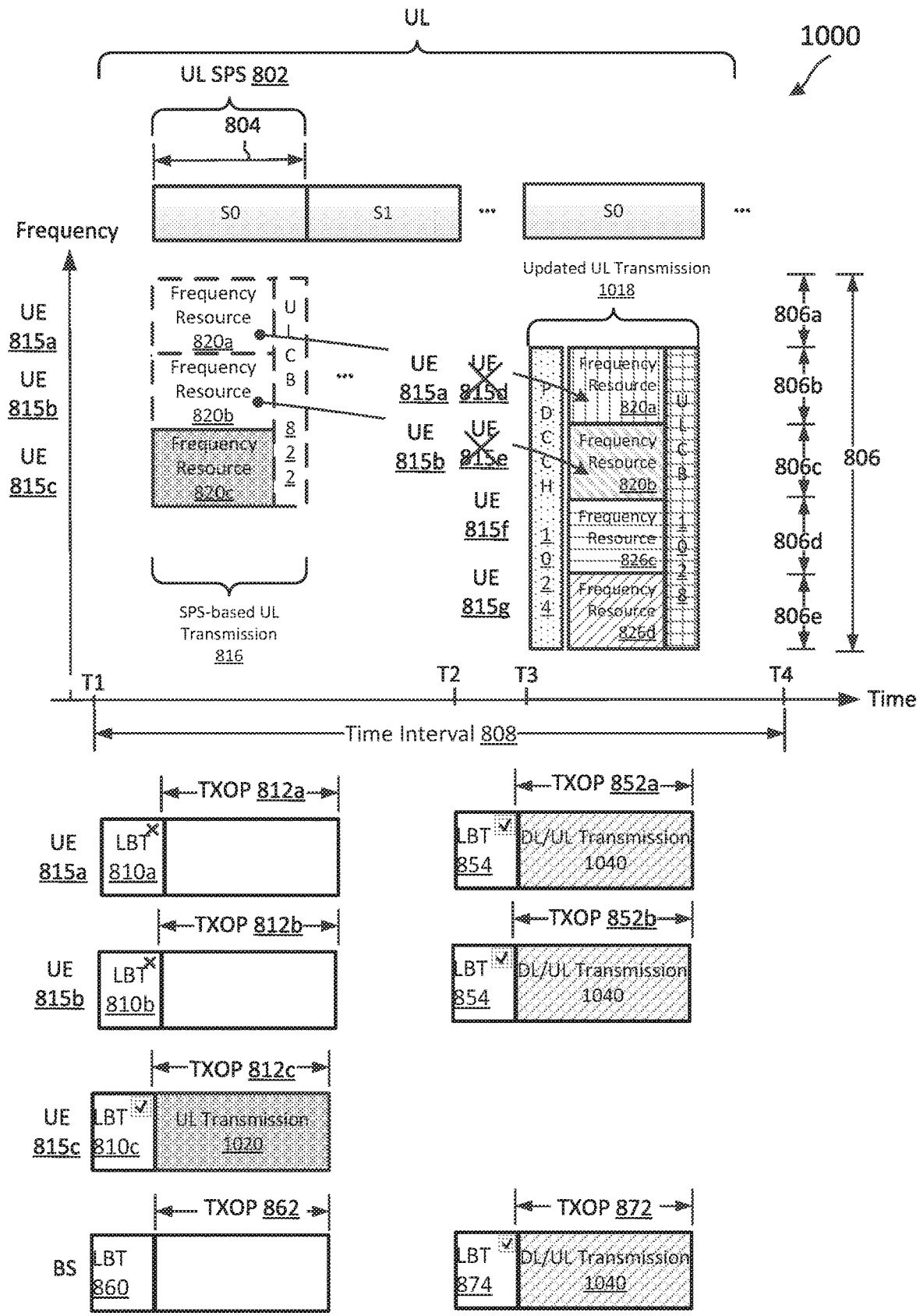
FIG. 10 illustrates a scheduling scheme for preempting UL resource allocations in a current schedule based on a failed LBT according to embodiments of the present disclosure.

FIG. 10 illustrates a scheduling scheme 1000 for preempting UL resource allocations in a current schedule based on a failed LBT according to embodiments of the present disclosure. In FIG. 10, the updated UL transmission 1018 is based on PDCCH scheduling in terms of the UL frequency resource allocations being indicated in a PDCCH 1024. One or more UEs from the group of UEs 815a, 815b, 815f, and 815g may transmit UL control information in a ULCB 1028.

The UE 815a and 815b perform a LBT 810a and 810b, respectively, and each LBT results in a fail. The UE 815c performs a LBT 810c to reserve a TXOP 812c, and the LBT results in a pass. The BS performs a LBT 860 to reserve a TXOP 862, and the LBT results in a pass. Accordingly, the UE 815c transmits a UL transmission 1020 using the frequency resource 820c in the frequency subband 806c to the BS, during the TXOP 812c. Additionally, the BS receives the communication signal using the frequency resource 820c in the frequency subband 806c from the UE 815c, during the TXOP 862. The BS does not detect UL signals from the UEs 815a and 815b and may reschedule their UL transmissions in a later TXOP (e.g., TXOP 872).

At about time T2, the UE 815a and UE 815b perform LBT 810a and LBT 810b to reserve a TXOP 812a and TXOP 812b, respectively, and the LBTs result in a pass. Additionally, the BS performs a LBT 874 to reserve a TXOP 872, and the LBT results in a pass. The BS may have already scheduled a prescheduled SPS UL transmission 818 for transmission during the TXOP (see FIG. 5). In FIG. 10, the updated UL transmission 1018 includes new resource allocations relative to the prescheduled SPS UL transmission 818 in FIG. 8. Referring back to FIG. 8, the BS may preempt the first and second resource allocations included in the prescheduled SPS UL transmission 818 with the first and second resource allocations included in the SPS-based UL transmission 816. The BS may preempt the frequency resource 826b assigned to the UE 815d with the missed frequency resource 820a assigned to the UE 815a and preempt the frequency resource 826b assigned to the UE 815e with the missed frequency resource 820b assigned to the UE 815b, but does not preempt other frequency resources included in the prescheduled SPS UL transmission 818. Accordingly, the BS may transmit DL signals to the UEs 815a, 815b, 815f, and 815g and/or receive UL signals from the UEs 815a, 815b, 815f, and 815g in a DL/UL transmission 1040, during the TXOP 872. Additionally, the subset of UEs 815a and 815b from the group of UEs 815-815c may receive DL signals from the BS and/or transmit UL signals to the BS in the DL/UL transmission 1040, during the TXOP 852a and TXOP 852b. The UEs 815f and 815g may receive DL signals from the BS and/or transmit UL signals to the BS in the DL/UL transmission 1040, during a TXOP.

In FIG. 10, the updated UL transmission 1018 includes UL transmission using the frequency resource 820a from the UE 815a and UL transmission using the frequency resource 820b from the UE 815b. The BS may provide an indication to the UEs 815a and 815b that the UL SPS 802 is valid for the TXOP 852a and TXOP 854b. Additionally, the BS may provide an indication to the UE 815d and the UE 815e that the originally assigned resource allocations included in the prescheduled SPS UL transmission 818 have been canceled.

Figure 11:
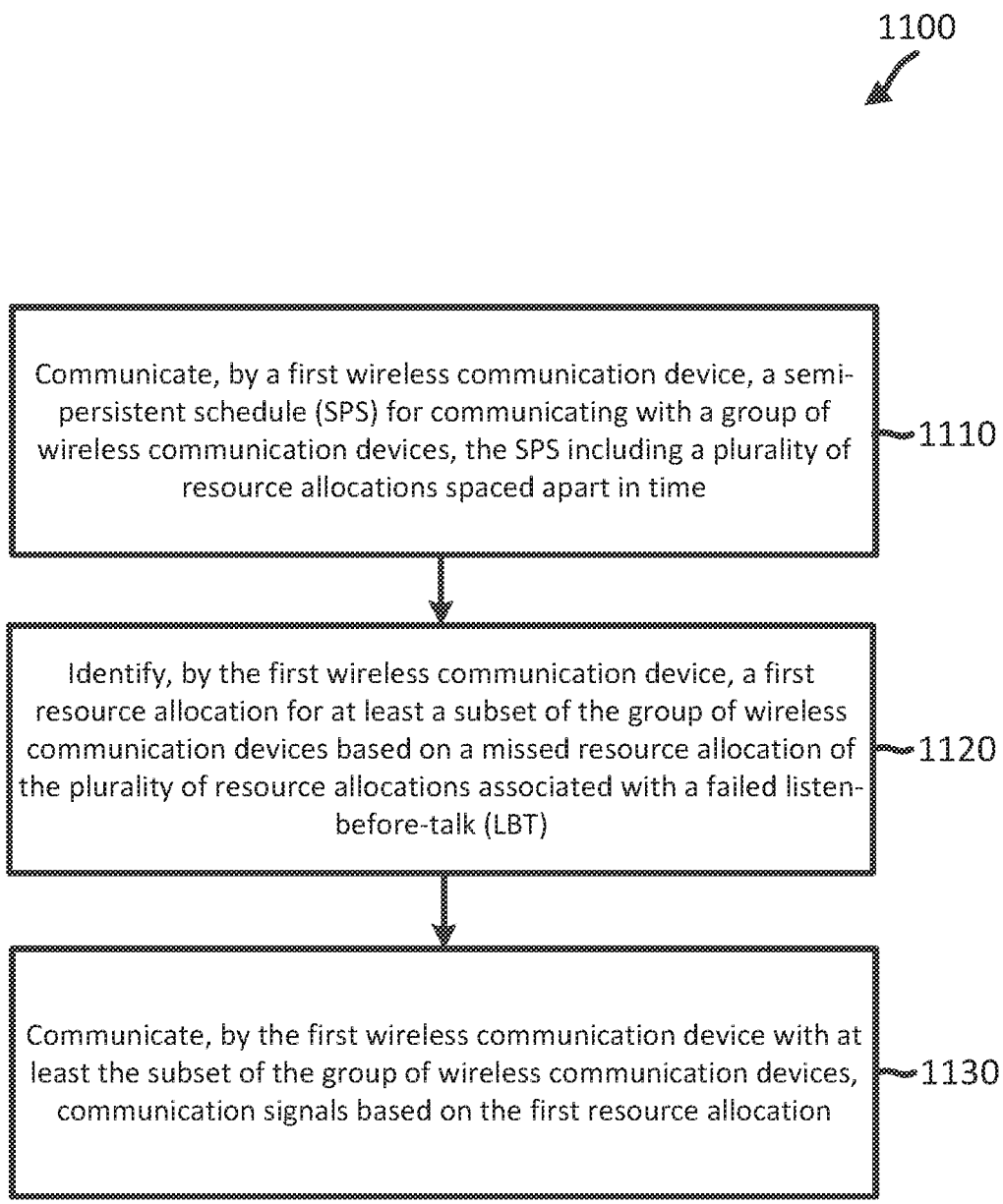
FIG. 11 is a flow diagram of communicating communication signals based on a failed LBT in a communication method according to one or more embodiments of the present disclosure.

FIG. 11 is a flow diagram of communicating communication signals based on a failed LBT in a communication method 1100 according to one or more embodiments of the present disclosure. Steps of the method 1100 can be executed by a computing device (e.g., a processor, processing circuit, and/or other suitable component) of a wireless communication device, such as the BSs 105, 300 or the UEs 115, 400. The method 1100 may employ similar mechanisms as in the schemes 500, 600, 700, 800, 900, and 1000 described above with respect to FIGS. 5-10, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes communicating, by a first wireless communication device, a SPS for communicating with a group of wireless communication devices, the SPS including a plurality of resource allocations spaced apart in time. In an example, the first wireless communication device may be a BS, and the group of wireless communication devices may include a group of UEs. The plurality of resource allocations may include one or more frequency-time domain resources. Additionally, the SPS may be a DL SPS or a UL SPS.

At step 1120, the method 1100 identifying, by the first wireless communication device, a first resource allocation for at least a subset of the group of wireless communication devices based on a missed resource allocation of the plurality of resource allocations associated with a failed LBT. In an example, the group of wireless communication devices is scheduled in a frame corresponding to the failed LBT. In another example, the group of wireless communication devices is scheduled in a slot corresponding to the failed LBT.

At step 1130, the method 1100 includes communicating, by the first wireless communication device with at least the subset of the group of wireless communication devices, communication signals based on the first resource allocation.

In some aspects, a method of wireless communication includes communicating, by a first wireless communication device, a SPS for communicating with a group of wireless communication devices, the SPS including a plurality of resource allocations spaced apart in time; identifying, by the first wireless communication device, a first resource allocation for at least a subset of the group of wireless communication devices based on a missed resource allocation of the plurality of resource allocations associated with a failed LBT; and communicating, by the first wireless communication device with at least the subset of the group of wireless communication devices, communication signals based on the first resource allocation. The first wireless communication device may be a BS, and the group of wireless communication devices may include a group of UEs. The plurality of resource allocations may include one or more frequency-time domain resources.

In some examples, the method also includes performing, by the first wireless communication device, a first LBT that results in the failed LBT; performing, by the first wireless communication device, a second LBT to reserve a TXOP; and preempting a second resource allocation scheduled for transmission during the TXOP with the first resource allocation, the second resource allocation being for a second wireless communication device. The second LBT may result in a LBT pass. In some examples, the method also includes communicating, by the first wireless communication device, an indication of the preempted second resource allocation to the second wireless communication device. In some examples, the method also includes preempting a third resource allocation scheduled for transmission during the TXOP with a fourth resource allocation of the plurality of resource allocations, the third resource allocation being for a third wireless communication device. The indication may be a group DCI communicated to the second and third wireless communication devices. The indication may be an individual DCI communicated to the second and third wireless communication devices.

In some examples, the method also includes communicating, by the first wireless communication device, an indication of the first resource allocation scheduled for transmission in the TXOP to the subset. The indication may be a group DCI. The indication may be an individual DCI. The group of wireless communication devices may be scheduled in a frame corresponding to the failed LBT. The group of wireless communication devices may be scheduled in a slot corresponding to the failed LBT. The SPS may be transmitted to the first group of wireless communication devices and a second group of wireless communication devices, and wherein the first group of wireless communication devices is assigned to a higher priority class than the second group of wireless communication devices.

In some aspects, an apparatus includes a processor configured to identify a first resource allocation for at least a subset of a group of wireless communication devices based on a missed resource allocation associated with a failed LBT; and a transceiver configured to: communicate a SPS for communicating with the group of wireless communication devices, the SPS including a plurality of resource allocations spaced apart in time, and the missed resource allocation being associated with the plurality of resource allocations; and communicate with at least the subset of the group of wireless communication devices, communication signals based on the first resource allocation.

The first wireless communication device may be a BS, and the group of wireless communication devices may include a group of UEs. The first wireless communication device may be a UE. The processor may be configured to perform a first LBT that results in the failed LBT, perform a second LBT to reserve a TXOP, and preempt a second resource allocation scheduled for transmission during the TXOP with the first resource allocation, and wherein the second resource allocation is assigned to a second wireless communication device. The transceiver may be configured to communicate an indication of the first resource allocation scheduled for transmission in the TXOP to the subset. The indication may be a group DCI or an individual DCI. The SPS may be transmitted to the first group of wireless communication devices and a second group of wireless communication devices, where the first group of wireless communication devices is assigned to a higher priority class than the second group of wireless communication devices.

In some aspects, a computer-readable medium having program code recorded thereon, the program code including: code for causing a first wireless communication device to communicate a SPS for communicating with a group of wireless communication devices, the SPS including a plurality of resource allocations spaced apart in time; code for causing the first wireless communication device to identify a first resource allocation for at least a subset of the group of wireless communication devices based on a missed resource allocation of the plurality of resource allocations associated with a failed LBT; and code for causing the first wireless communication device to communicate with at least the subset of the group of wireless communication devices, communication signals based on the first resource allocation.

In some aspects, an apparatus comprising: means for communicating a SPS for communicating with a group of wireless communication devices, wherein the SPS includes a plurality of resource allocations spaced apart in time; means for identifying a first resource allocation for at least a subset of the group of wireless communication devices based on a missed resource allocation of the plurality of resource allocations associated with a failed LBT; and means for communicating with at least the subset of the group of wireless communication devices, communication signals based on the first resource allocation.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device, a semi-persistent schedule (SPS) for communicating with a group of wireless communication devices, the SPS including a plurality of resource allocations spaced apart in time;
   identifying, by the first wireless communication device, a first resource allocation for at least a subset of the group of wireless communication devices based on a missed resource allocation of the plurality of resource allocations associated with a failed listen-before-talk (LBT), wherein the first resource allocation is associated with a transmission opportunity (TXOP);
   preempting a second resource allocation scheduled for transmission during the TXOP with the first resource allocation, the second resource allocation being for a second wireless communication device; and
   communicating, by the first wireless communication device with at least the subset of the group of wireless communication devices, communication signals based on the first resource allocation.

2. The method of claim 1, wherein the plurality of resource allocations includes one or more frequency-time domain resources.

3. The method of claim 1, further comprising:
   performing, by the first wireless communication device, a first LBT that results in the failed LBT; and
   performing, by the first wireless communication device, a second LBT to reserve the transmission opportunity (TXOP).

4. The method of claim 3, wherein the second LBT results in a LBT pass.

5. The method of claim 3, further comprising:
   communicating, by the first wireless communication device, an indication of the preempted second resource allocation to the second wireless communication device.

6. The method of claim 5, further comprising:
   preempting a third resource allocation scheduled for transmission during the TXOP with a fourth resource allocation of the plurality of resource allocations, the third resource allocation being for a third wireless communication device.

7. The method of claim 6, wherein the indication is a group DCI communicated to the second and third wireless communication devices.

8. The method of claim 6, wherein the indication is an individual DCI communicated to the second and third wireless communication devices.

9. The method of claim 3, further comprising:
   communicating, by the first wireless communication device, an indication of the first resource allocation scheduled for transmission in the TXOP to the subset.

10. The method of claim 9, wherein the indication is a group DCI.

11. The method of claim 9, wherein the indication is an individual DCI.

12. The method of claim 3, wherein the group of wireless communication devices is scheduled in a frame or a slot corresponding to the failed LBT.

13. The method of claim 3, wherein the SPS is transmitted to the group of wireless communication devices and a second group of wireless communication devices, and wherein the group of wireless communication devices is assigned to a higher priority class than the second group of wireless communication devices.

14. The method of claim 1, further comprising:
   communicating, by the first wireless communication device, an override signal indicating cancellation of a feedback associated with the second resource allocation.

15. The method of claim 14, wherein the feedback is an acknowledgement (ACK)/negative-ACK (NACK).

16. An apparatus comprising:
   a processor configured to:
      identify a first resource allocation for at least a subset of a group of wireless communication devices based on a missed resource allocation associated with a failed LBT, wherein the first resource allocation is associated with a transmission opportunity (TXOP); and
      preempt a second resource allocation scheduled for transmission during the TXOP with the first resource allocation, the second resource allocation being assigned to a second wireless communication device; and
   a transceiver configured to:

communicate a SPS for communicating with the group of wireless communication devices, the SPS including a plurality of resource allocations spaced apart in time, and the missed resource allocation being associated with the plurality of resource allocations; and communicate with at least the subset of the group of wireless communication devices, communication signals based on the first resource allocation.

17. The apparatus of claim 16, wherein the apparatus is a UE.

18. The apparatus of claim 17, wherein the SPS is transmitted to the group of wireless communication devices and a second group of wireless communication devices, and wherein the group of wireless communication devices is assigned to a higher priority class than the second group of wireless communication devices.

19. The apparatus of claim 16, wherein the processor is configured to perform a first LBT that results in the failed LBT, and perform a second LBT to reserve the transmission opportunity (TXOP).

20. The apparatus of claim 19, wherein the transceiver is configured to communicate an indication of the first resource allocation scheduled for transmission in the TXOP to the subset.

21. The apparatus of claim 20, wherein the indication is a group DCI.

22. The apparatus of claim 20, wherein the indication is an individual DCI.

23. The apparatus of claim 16, wherein the transceiver communicates an override signal indicating cancellation of a feedback associated with the second resource allocation.

24. The apparatus of claim 23, wherein the feedback is an acknowledgement (ACK)/negative-ACK (NACK).

25. A non-transitory, computer-readable medium having program code recorded thereon, the program code comprising:
    code for causing a first wireless communication device to communicate a SPS for communicating with a group of wireless communication devices, the SPS including a plurality of resource allocations spaced apart in time;
    code for causing the first wireless communication device to identify a first resource allocation for at least a subset of the group of wireless communication devices based on a missed resource allocation of the plurality of resource allocations associated with a failed LBT, wherein the first resource allocation is associate with a transmission opportunity (TXOP);
    code for causing the first wireless communication device to preempt a second resource allocation scheduled for transmission during the TXOP with the first resource allocation, the second resource allocation being for a second wireless communication device; and
    code for causing the first wireless communication device to communicate with at least the subset of the group of wireless communication devices, communication signals based on the first resource allocation.

26. The non-transitory, computer-readable medium of claim 25, the program code further comprising:
    code for causing the first wireless communication device to perform a first LBT that results in the failed LBT; and
    code for causing the first wireless communication device to perform a second LBT to reserve the transmission opportunity (TXOP).

27. The non-transitory, computer-readable medium of claim 26, the program code further comprising:
    code for causing the first wireless communication device to communicate an indication of the first resource allocation scheduled for transmission in the TXOP to the subset, wherein the indication is a group DCI or an individual DCI.

28. The non-transitory, computer-readable medium of claim 25, wherein the SPS is transmitted to the group of wireless communication devices and a second group of wireless communication devices, and wherein the group of wireless communication devices is assigned to a higher priority class than the second group of wireless communication devices.

29. The non-transitory, computer-readable medium of claim 25, the program code further comprising:
    code for causing the first wireless communication device to communicate an override signal indicating cancellation of a feedback associated with a second resource allocation, wherein the second resource allocation is scheduled for transmission during a TXOP and is preempted by the first resource allocation during the TXOP.

30. The non-transitory, computer-readable medium of claim 29, wherein the feedback is an acknowledgement (ACK)/negative-ACK (NACK).

* * * * *